United States Patent
Yamauchi et al.

(10) Patent No.: US 10,591,693 B2
(45) Date of Patent: Mar. 17, 2020

(54) TERMINATION UNIT AND OPTICAL FIBER EXCHANGE METHOD USING THE SAME

(71) Applicants: SUMITOMO ELECTRIC INDUSTRIES, LTD., Osaka-shi, Osaka (JP); SEI Optifrontier Co., Ltd., Yokohama-shi, Kanagawa (JP)

(72) Inventors: Takayasu Yamauchi, Osaka (JP); Tomohiko Ueda, Osaka (JP); Junji Fukui, Yokohama (JP); Yukihiro Yokomachi, Yokohama (JP); Tomoyuki Yokokawa, Yokohama (JP); Takayuki Yokochi, Komaki (JP); Masanori Yamanaka, Komaki (JP)

(73) Assignees: SUMITOMO ELECTRIC INDUSTRIES, LTD., Osaka-shi, Osaka (JP); SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/108,462

(22) Filed: Aug. 22, 2018

(65) Prior Publication Data
US 2019/0064468 A1    Feb. 28, 2019

(30) Foreign Application Priority Data
Aug. 23, 2017 (JP) .................................. 2017-160313

(51) Int. Cl.
*G02B 6/44* (2006.01)
*G02B 6/38* (2006.01)
*H02G 3/06* (2006.01)

(52) U.S. Cl.
CPC ......... *G02B 6/4471* (2013.01); *G02B 6/3825* (2013.01); *G02B 6/4452* (2013.01); *G02B 6/4454* (2013.01); *H02G 3/0608* (2013.01)

(58) Field of Classification Search
None
See application file for complete search history.

(56) References Cited

U.S. PATENT DOCUMENTS

| 7,460,758 B2 * | 12/2008 | Xin | ...................... G02B 6/4452 385/134 |
| 2010/0195969 A1 * | 8/2010 | Kennedy | .............. G02B 6/4471 385/135 |

(Continued)

FOREIGN PATENT DOCUMENTS

JP        2012-53098 A     3/2012

*Primary Examiner* — Chad H Smith
(74) *Attorney, Agent, or Firm* — Drinker Biddle & Reath LLP

(57) ABSTRACT

A termination unit located on a rack part of an optical fiber rack includes a housing a plurality of first optical fibers located in the housing, the plurality of first optical fibers being fusion spliced to a multi fiber cable introduced from an outside of the optical fiber rack, an adapter group including a plurality of adapters in a line in the housing, the plurality of adapters being respectively connected to the plurality of first optical fibers on an inside of the housing and being respectively connected to a plurality of second optical fibers on an outside of the housing, and an optical fiber passing part through which at least one optical fiber is configured to pass, the optical fiber passing part being located in at least one of: the adapter group, and between the housing and the adapter group in an arrangement direction.

9 Claims, 17 Drawing Sheets

(56) References Cited

U.S. PATENT DOCUMENTS

| | | | | |
|---|---|---|---|---|
| 2012/0134639 A1* | 5/2012 | Giraud | ............... | G02B 6/4454 385/135 |
| 2013/0034330 A1* | 2/2013 | Barron | ............... | G02B 6/4454 385/96 |
| 2015/0362678 A1* | 12/2015 | Van Baelen | ......... | G02B 6/3893 385/56 |

* cited by examiner

TERMINATION UNIT AND OPTICAL FIBER EXCHANGE METHOD USING THE SAME

CROSS-REFERENCE TO RELATED APPLICATION

This application claims the benefit of priority of Japanese Patent Application No. 2017-160313, filed Aug. 23, 2017, the entire contents of which are incorporated herein by reference.

TECHNICAL FIELD

The present disclosure relates to a termination unit and an optical fiber exchange method using the same.

BACKGROUND

For example, Japanese Unexamined Patent Publication No. 2012-53098 has proposed an optical wiring board including a plurality of adapter groups arranged in a vertical direction, and a wiring housing part for housing an optical fiber cord connected to the adapter group. In the wiring housing part, the optical fiber cord is supported by a gripping member, rises after sagging along a downward guidance bending part to be suspended by a suspension means.

SUMMARY

A termination unit according to an aspect of the present disclosure is a termination unit to be located on a rack part of an optical fiber rack, and includes a housing, a plurality of first optical fibers located in the housing, the plurality of first optical fibers being fusion spliced to a multi fiber cable introduced from an outside of the optical fiber rack, an adapter group including a plurality of adapters in a line in the housing, the plurality of adapters being respectively connected to the plurality of first optical fibers on an inside of the housing and being respectively connected to a plurality of second optical fibers on an outside of the housing, and an optical fiber passing part though which at least one optical fiber is configured to pass, the optical fiber passing part being located in at least one of: the adapter group; and between the housing and the adapter group in an arrangement direction of the plurality of adapters.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
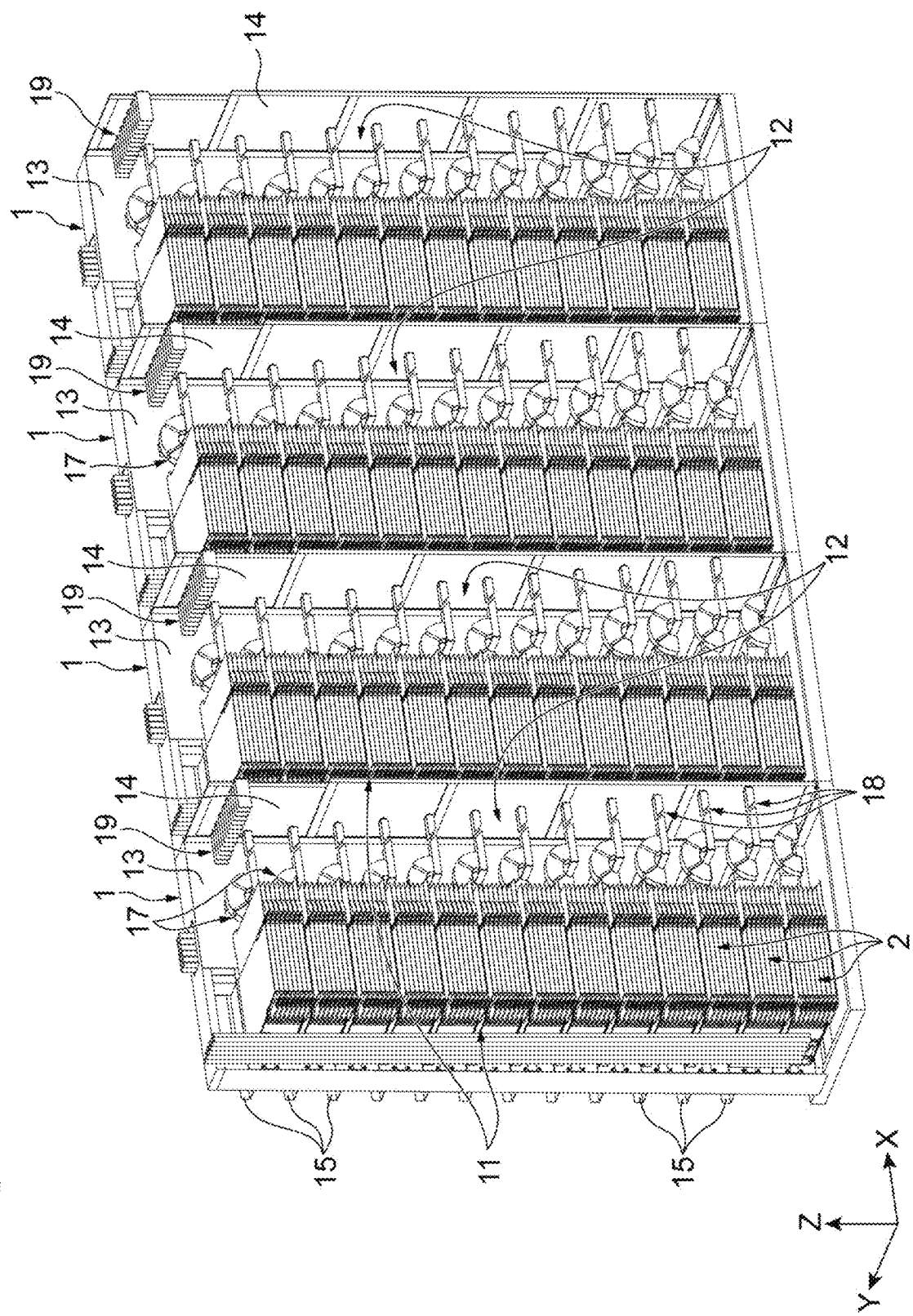
FIG. 1 is a diagram illustrating a state in which optical fiber racks according to an embodiment are arranged in one direction.

Description of Embodiments of the Present Disclosure

First, the contents of the embodiments of the present disclosure will be described in a listing manner. An embodiment of the present disclosure is a termination unit to be located on a rack part of an optical fiber rack, and includes a housing, a plurality of first optical fibers located in the housing, the plurality of first optical fibers being fusion spliced to a multi fiber cable introduced from an outside of the optical fiber rack, an adapter group including a plurality of adapters in a line in the housing, the plurality of adapters being respectively connected to the plurality of first optical fibers on an inside of the housing and being respectively connected to a plurality of second optical fibers on an outside of the housing, and an optical fiber passing part though which at least one optical fiber is configured to pass, the optical fiber passing part being located in at least one of: the adapter group; and between the housing and the adapter group in an arrangement direction of the plurality of adapters.

For example, an optical fiber rack used in a base station or the like of an optical communication system includes a plurality of rack parts arranged in a vertical direction, and a plurality of termination units are arranged on each rack part. A plurality of optical fibers are connected to the plurality of adapters which each termination unit has. Along with the recent increase in the amount of optical communication, in such an optical fiber rack, many adapters are arranged at high density, for example, in a vertical direction and a right and left direction in the termination unit. In this case, there are many optical fibers branched and fusion spliced to a multi fiber cable introduced from the outside in each termination unit. Among such many optical fibers, a defect or the like may occur in a certain optical fiber, and a connection failure may occur only in a transmission path via the optical fiber. In this case, it is troublesome and difficult to extract only the optical fiber in which a defect has occurred from the adapter, and to insert another optical fiber into the adapter to fix the above-mentioned connection failure.

On the other hand, the termination unit according to the above embodiment includes the optical fiber passing part located in at least one of between the housing and the adapter group in the arrangement direction of the plurality of adapters and in the adapter group, and through which at least one optical fiber is configured to pass. Therefore, for example, when a connection failure occurs due to a specific first optical fiber in the plurality of first optical fibers provided in the housing, it is possible to easily house an exchange optical fiber for the specific first optical fiber in the housing from the same side as the second optical fiber via the optical fiber passing part. Accordingly, the specific first optical fiber can be extracted from the adapter, and the exchange optical fiber can be inserted into the adapter. Therefore, by using the above termination unit, it is possible to easily fix the connection failure caused by the specific optical fiber in the housing in the optical fiber rack.

The termination unit may further include a second optical fiber passing part though which at least one optical fiber is configured to pass, wherein the adapter group is interposed between the optical fiber passing part and the second optical fiber passing part in the arrangement direction. In this case, it is possible to suppress bending of the exchange optical fiber in the housing exceeding an allowable bending deformation by passing the exchange optical fiber through the optical fiber passing part apart from the first optical fiber to be exchanged. For this reason, it is possible to suppress breakage of a part in the exchange optical fiber, the part being housed in the housing.

The termination unit may further include a second optical fiber passing part though which at least one optical fiber is configured to pass, wherein the optical fiber passing part is located between the housing and the adapter group in the arrangement direction, and wherein the second optical fiber passing part is located in the adapter group. In this case, it is possible to suppress bending of the exchange optical fiber in the housing exceeding the allowable bending deformation by passing the exchange optical fiber through the optical fiber passing part apart from the first optical fiber to be exchanged. For this reason, it is possible to suppress breakage of the part in the exchange optical fiber, the part being housed in the housing.

The termination unit according to an embodiment may further include a cover sheet configured to cover an optical fiber part of the plurality of first optical fibers in the housing. In this case, it is possible to suppress breakage of the plurality of first optical fibers by the exchange optical fiber.

An optical fiber exchange method using the termination unit according to the embodiment, includes cutting a third optical fiber of the multi fiber cable connected to one of the plurality of first optical fibers outside the optical fiber rack, fusion splicing a cut face of the cut third optical fiber to an exchange optical fiber, housing a tip part of the exchange optical fiber in the housing via the optical fiber passing part, and inserting the tip part of the exchange optical fiber into the adapter after extracting the first optical fiber to be disconnected from the adapter. According to this exchanging method, by steps of fusion splicing, the housing and the connection exchanging, the first optical fiber to be disconnected can be extracted from the adapter. The exchange optical fiber connected to the third optical fiber can be housed in the housing from the same side as the second optical fiber via the optical fiber passing part and can be inserted into the adapter. This makes it possible to easily fix a connection failure caused by a specific optical fiber in the housing in the optical fiber rack.

Detail of Embodiments of the Present Disclosure

Preferred embodiments of the present disclosure will now be described in detail with reference to the accompanying drawings. In the following description, the same components or components having the same function are designated by the same reference sign, and a duplicated description is omitted.

Figure 2:
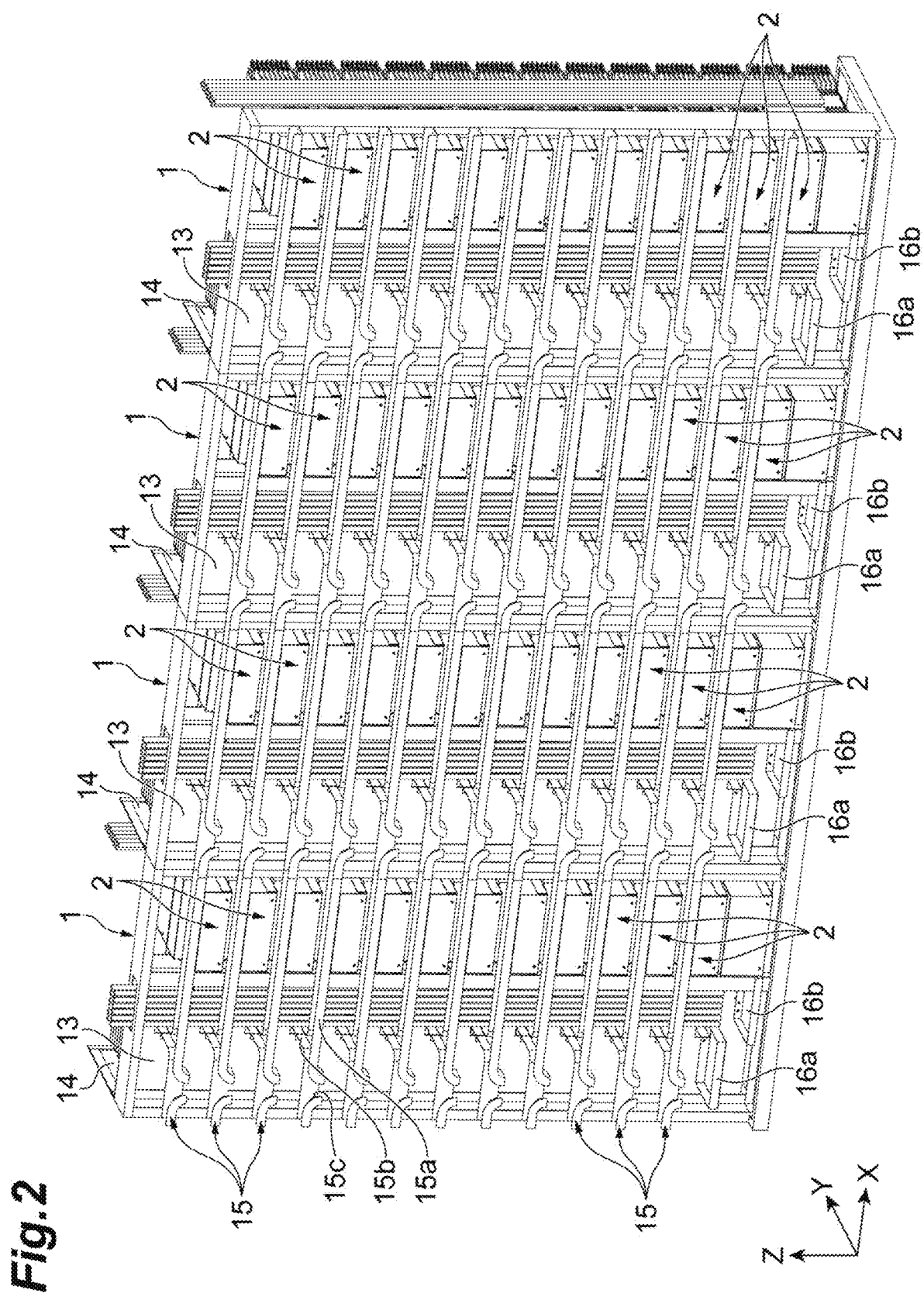
FIG. 2 is a diagram of FIG. 1 as viewed from a back side.
Figure 3:
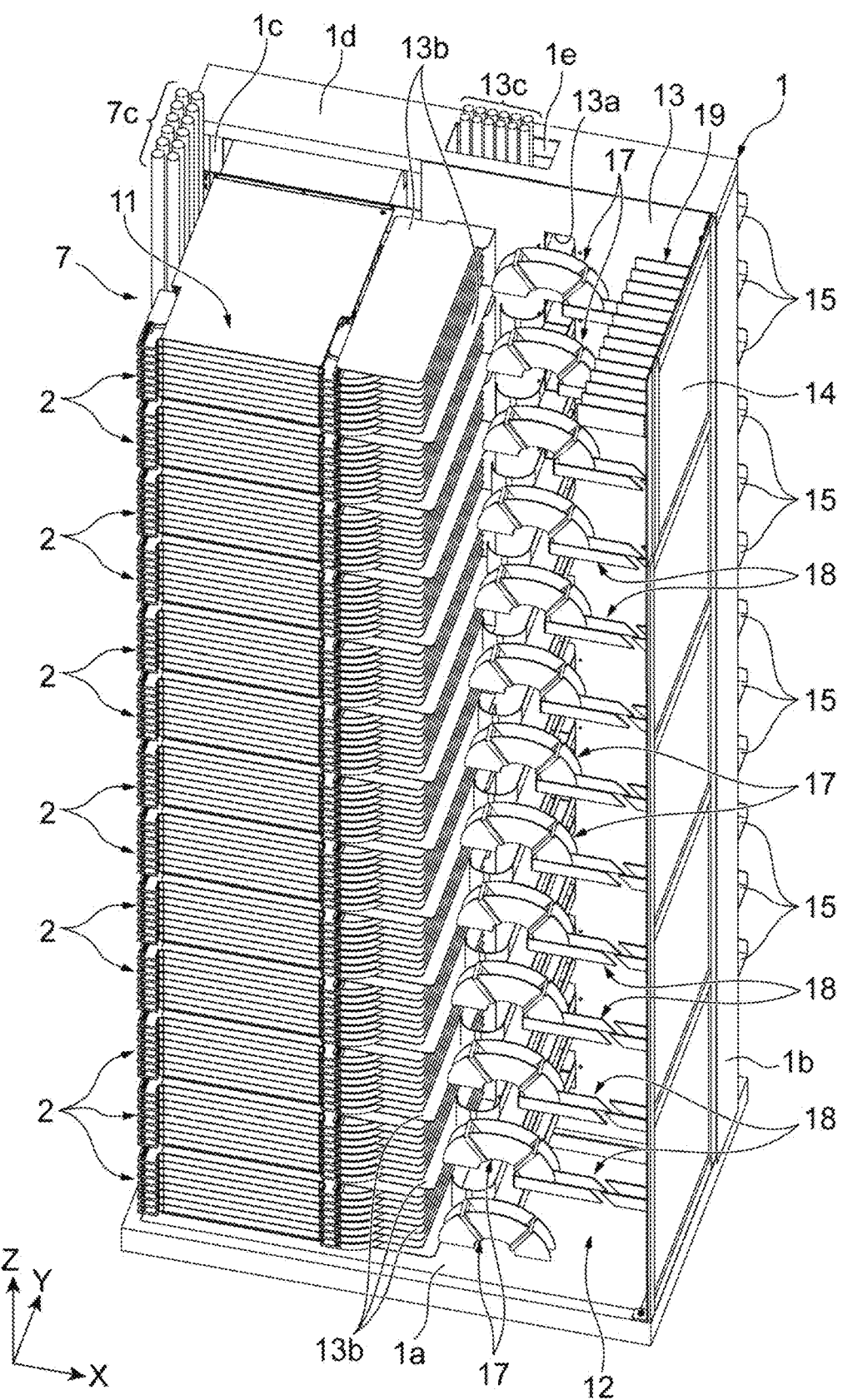
FIG. 3 is a schematic perspective view illustrating the optical fiber rack according to the embodiment.
Figure 4:
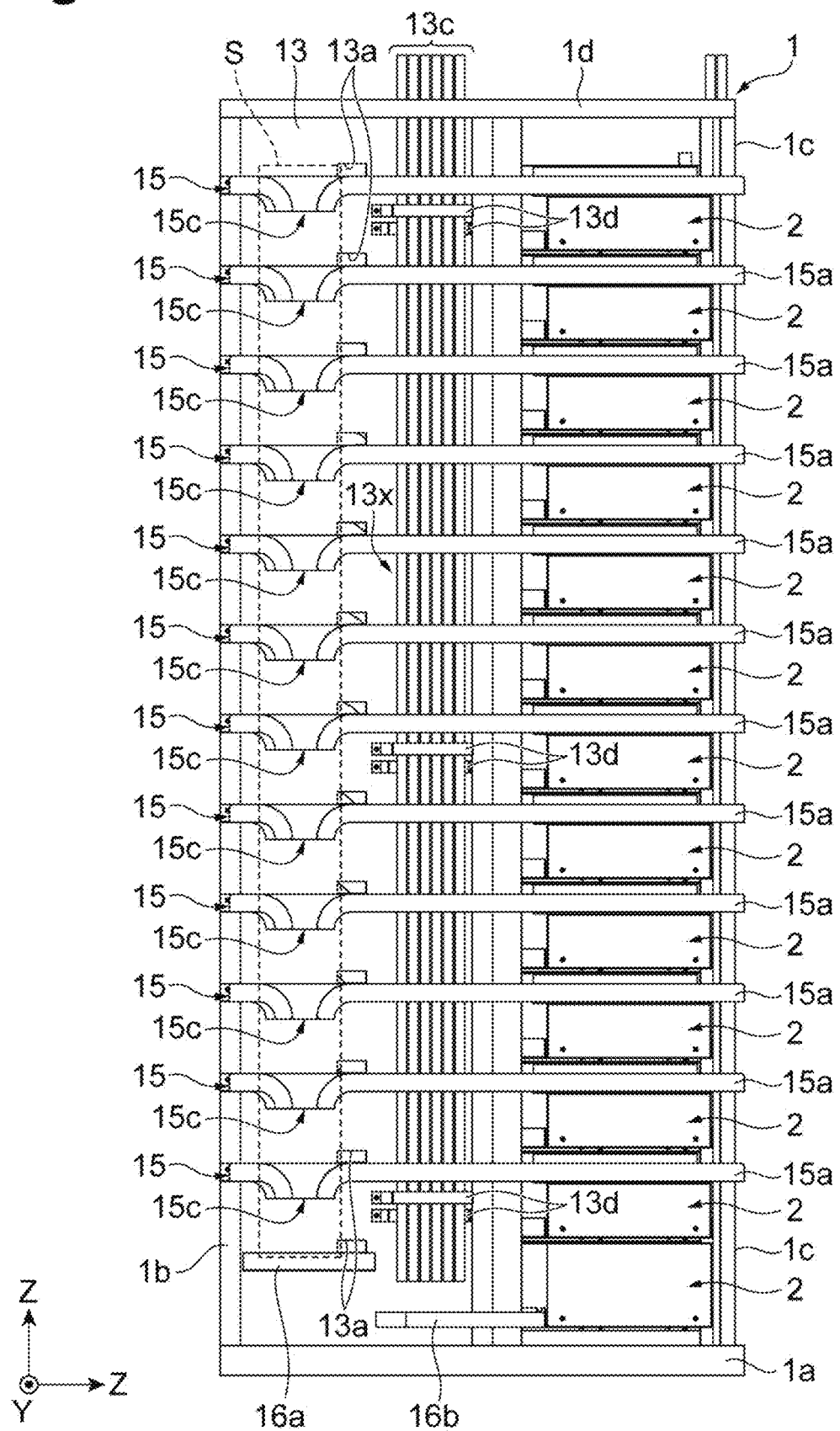
FIG. 4 is a back side view illustrating the optical fiber rack according to the embodiment.

FIG. 1 is a diagram illustrating a state in which optical fiber racks according to the present embodiment are arranged in one direction, and FIG. 2 is a diagram of FIG. 1 as viewed from a back side. FIG. 3 is a schematic perspective view illustrating the optical fiber rack according to the embodiment, and FIG. 4 is a back side view illustrating the optical fiber rack according to the embodiment. In FIG. 1 to FIG. 4, all optical fiber cords (optical fibers) are omitted. Hereinafter, a direction in which a plurality of optical fiber racks 1 are arranged is defined as a direction X (right and left direction), a direction crossing (for example, orthogonal to) the direction X in the horizontal direction is defined as a direction Y (front and rear direction), a direction crossing (for example, orthogonal to) the direction X and the direction Y is defined as a direction Z (vertical direction).

The optical fiber rack 1 illustrated in FIG. 1 to FIG. 4 is an apparatus used when terminating the optical fiber cord at a data center or the like, and is also referred to as FDF (Fiber Distributing Frame), for example. In the optical fiber rack 1, a termination unit 2 (details will be described later) is located, which retains a multicore optical fiber, and houses a connection point. In the optical fiber rack 1, a multi fiber cable optically connected to the termination unit 2 is divided into a plurality of optical fibers and subjected to line-arrangement. The multi fiber cable is a cable having several tens to several hundreds of optical fibers. In the embodiment, the multi fiber cable has 288 optical fibers.

Next, specific configuration of the optical fiber rack 1 will be described. The optical fiber rack 1 is composed of a bottom frame part 1a as a pedestal, a pair of vertical frame parts 1b and 1c extending from the bottom frame part 1a in the direction Z, and a top frame part 1d provided on top faces of the vertical frame parts 1b and 1c, and has a frame-like outer shape. The optical fiber rack 1 includes a rack part 11, an optical fiber housing part 12, a partition plate 13, a lateral plate 14, a plurality of rails 15, trays 16a and 16b, a plurality of optical fiber guides 17, a plurality of first dividing members 18, and a second dividing member 19.

The rack part 11 is a part on which a plurality of termination units 2 arranged in the direction Z are located. In the rack part 11, a plurality of shelf plates, not illustrated in the figure, are provided in the vertical direction, for example, and the termination unit 2 is located on each shelf plate.

Figure 5A:
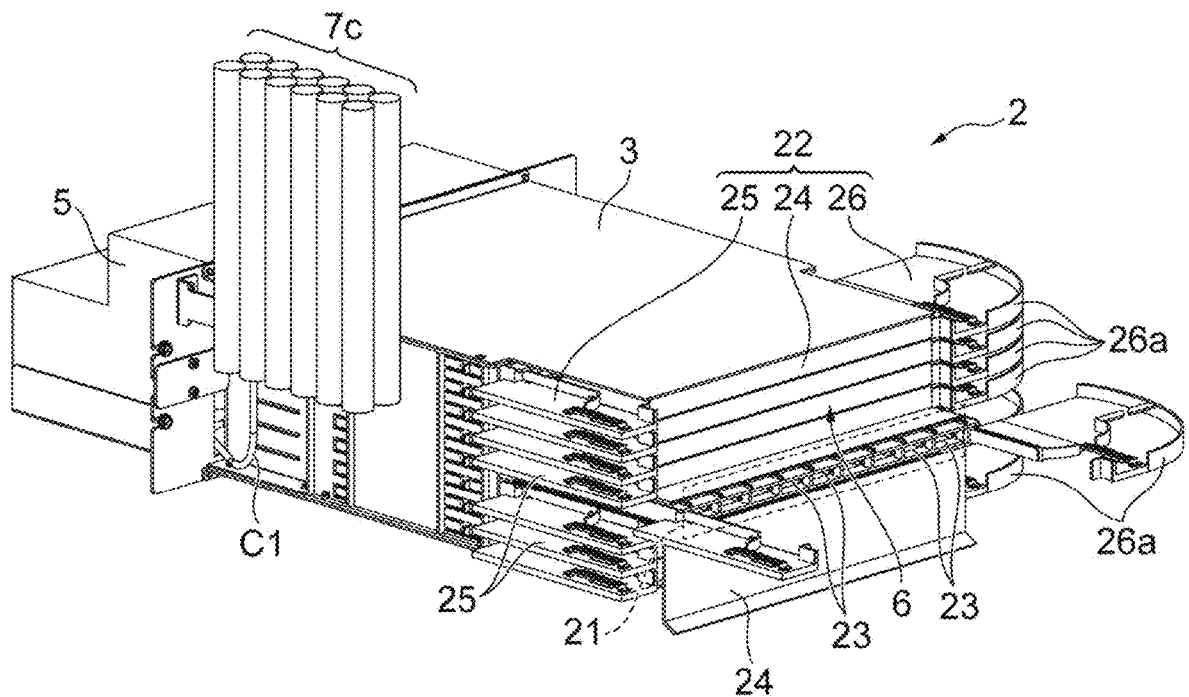
FIG. 5A is a front side perspective view of a termination unit and FIG. 5B is a back side perspective view of the termination unit.
Figure 5B:
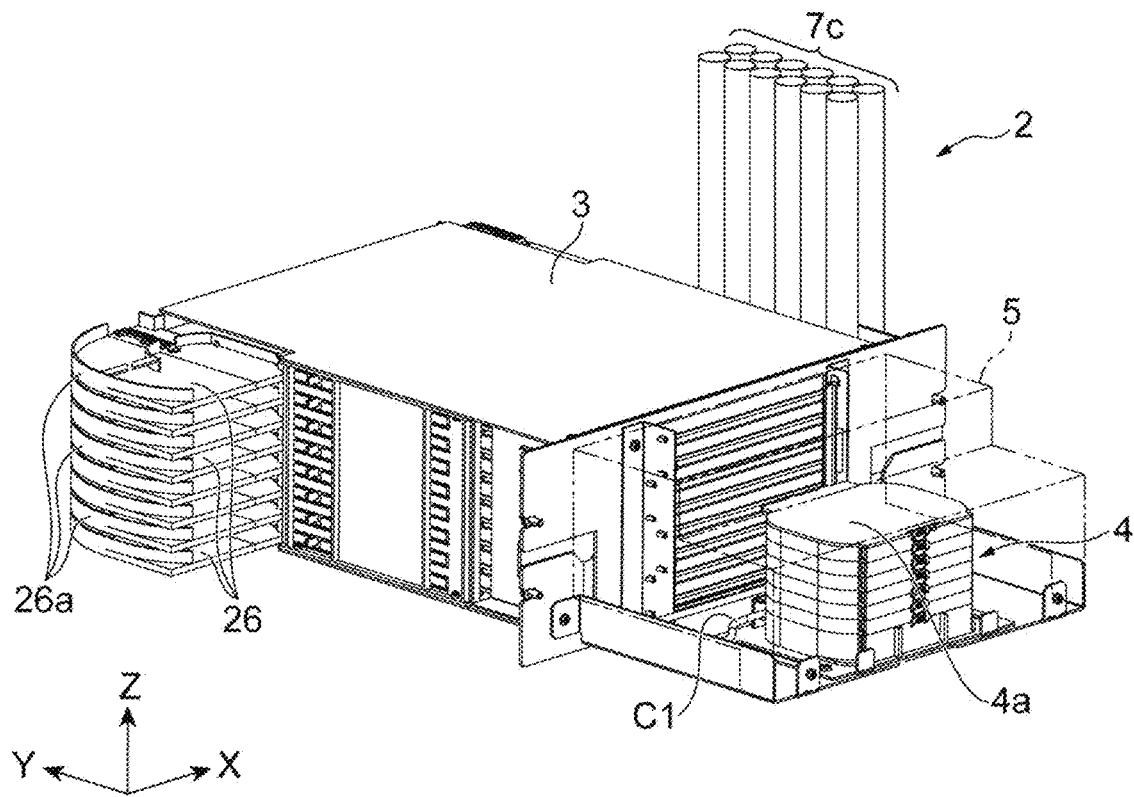
Figure 6:
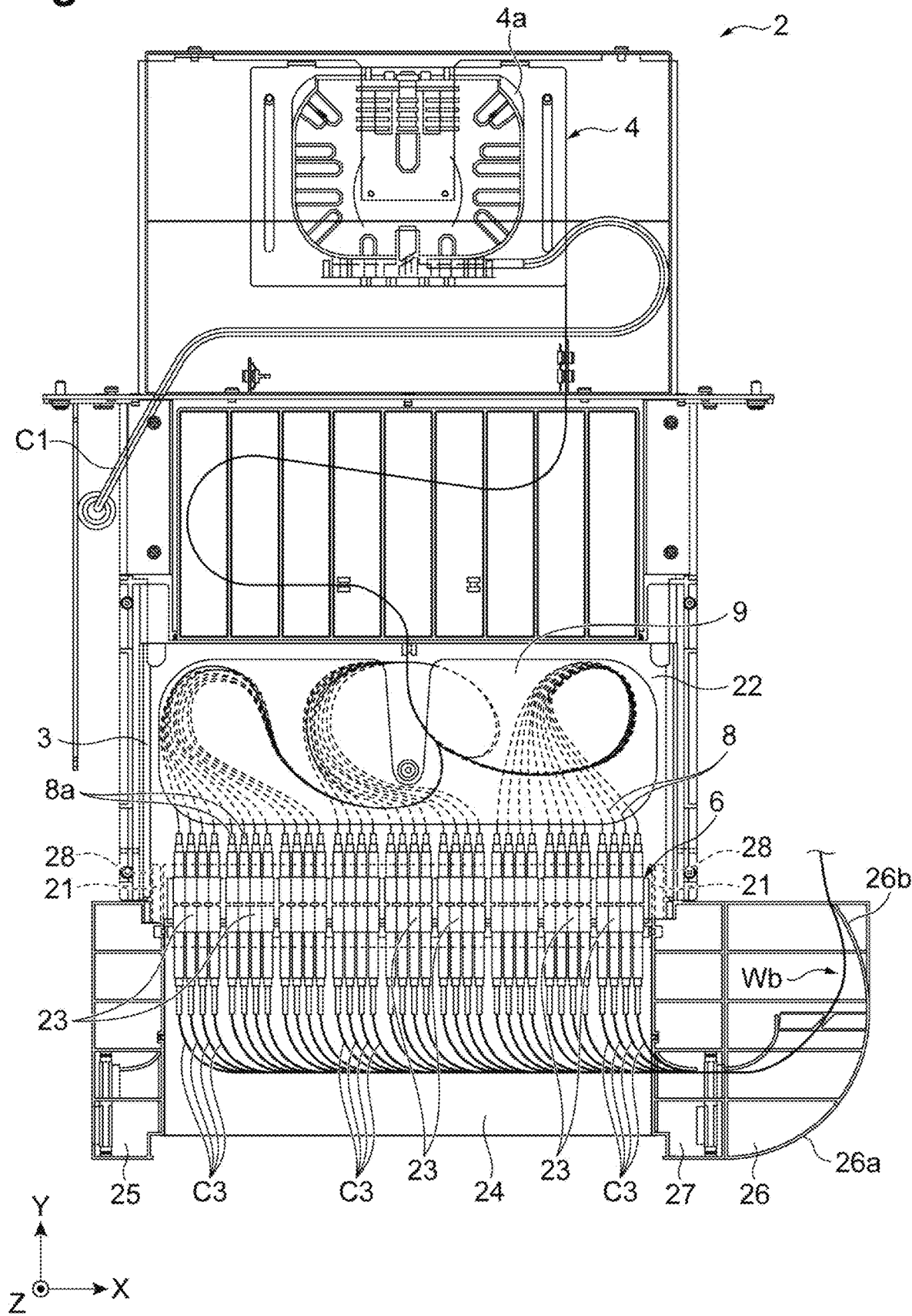
FIG. 6 is a diagram illustrating a part of an interior of the termination unit.
Figure 7:
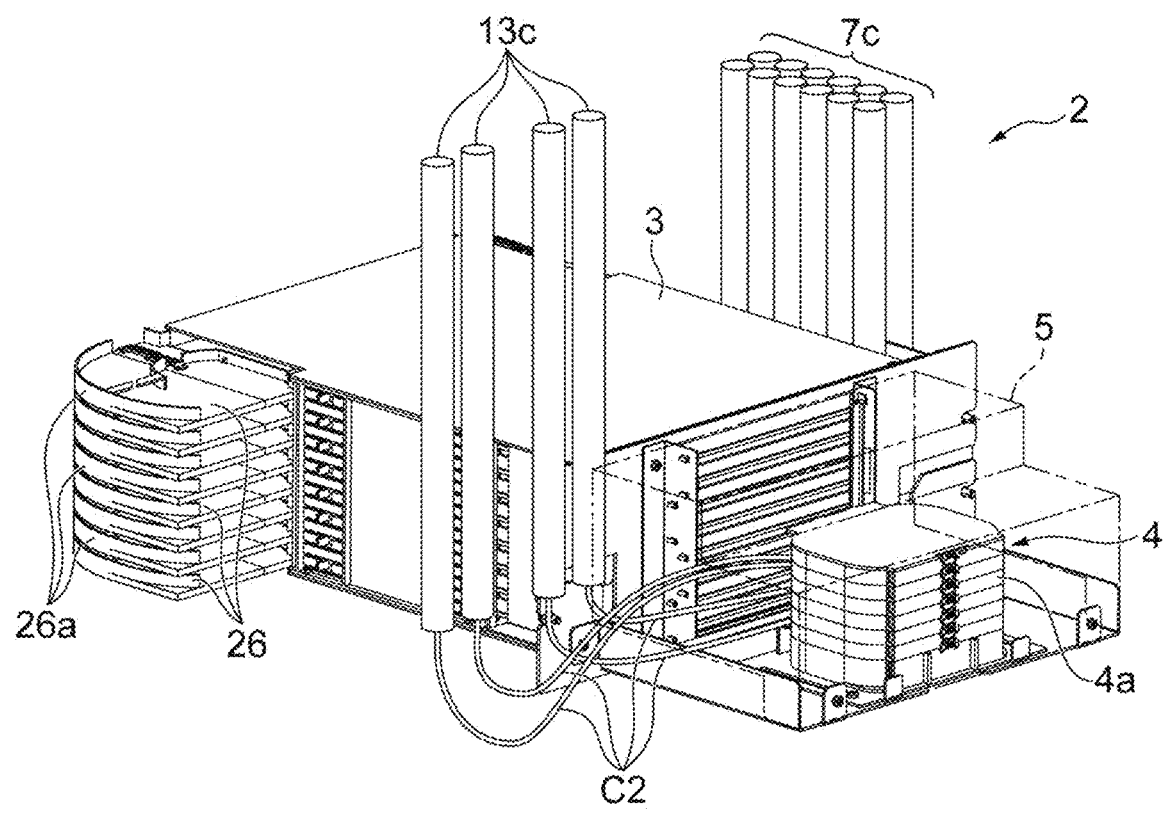
FIG. 7 is a diagram illustrating a termination unit positioned at a lowermost position in a rack part.
Figure 7:
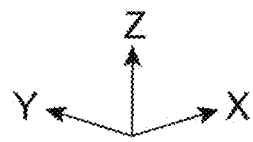

Here, functions and configuration of the termination unit 2 will be described with reference to FIG. 5A to FIG. 7. FIG. 5A is a front side perspective view of the termination unit 2. FIG. 5B is a back side perspective view of the termination unit 2. FIG. 6 is a diagram illustrating a part of an interior of the termination unit 2. FIG. 7 is a diagram illustrating the termination unit 2 positioned at a lowermost position in the rack part 11. As illustrated in FIG. 5A, FIG. 5B, and FIG. 6, the termination unit 2 includes a housing 3 having a substantially rectangular parallelepiped shape, a first external connection portion 4 provided on a back end side of the housing 3, a lid part 5 covering the first external connection portion 4, a second external connection portion 6 provided at a front end side of the termination unit 2 in the direction Y, a plurality of optical fibers 8 with connector provided in the housing 3, and a cover sheet 9 provided in the housing 3. The optical fiber 8 with connector has an optical fiber and an optical connector 8a, and hereinafter simply referred to as the first optical fiber 8.

The first external connection portion 4 is a part into which the multi fiber cable extending from a fusion rack or the like, for example, is introduced, and is a part in which the multi fiber cable is optically connected to the termination unit 2. The first external connection portion 4 has a fusion tray 4a housing portions where the optical fibers are fusion spliced to each other. In the fusion tray 4a, any one of optical fibers C1 of multi fiber cable 7c housed in a cable housing part 7, and an optical fiber C2 of a multi fiber cable (hereinafter referred to as local fusion cable 13c) not housed in the cable housing part 7, and one end of the plurality of first optical fibers 8 are optically connected by fusion splicing. In the embodiment, the optical fibers C1 of the multi fiber cable 7c are introduced into the first external connection portion 4 in the termination unit 2 other than the termination unit 2 positioned at the lowermost position. On the other hand, as illustrated in FIG. 7, in the termination unit 2 positioned at the lowermost position, the optical fiber C2 housed in the local fusion cable 13c is introduced into the first external connection portion 4. The fusion splicing may be performed after the termination unit 2 is located on the rack part 11, or may be performed before the termination unit 2 is located on the rack part 11. In the embodiment, in the termination unit 2 positioned at the lowermost position, the fusion splicing is performed after the termination unit 2 is located on the rack part 11. The optical fiber C2 may be a multi fiber cable.

The lid part 5 is a lid covering the first external connection portion 4. The lid part 5 is detachably attached to the housing 3.

The second external connection portion 6 is a part for optically connecting the other end of the plurality of first optical fibers 8 to a bundle of optical fibers C3 (second optical fibers) (hereinafter referred to as an optical fiber bundle Wb) connected with an external device or the like (e.g., a server). The second external connection portion 6 includes a plurality of adapter groups 21 stacked on each other, and a plurality of trays 22 dividing and protecting each adapter group 21. Each adapter group 21 has a plurality of adapters 23 for optically connecting the plurality of first optical fibers 8, and the plurality of optical fibers C3, respectively. Each optical fiber C3 constituting the optical fiber bundle Wb is connected to the adapter 23 on the outside (one end side of each adapter 23 in the direction Y) of the housing 3. The plurality of first optical fibers 8 are connected to the adapter 23 on the inside (the other end side of each adapter 23 in the direction Y) of the housing 3. The plurality of adapters 23 included in each adapter group 21 are arranged in a line in the direction X on the tray 22. Therefore, the direction X can also be referred to as an arrangement direction of the plurality of adapters 23.

Each tray 22 is positioned below the corresponding adapter group 21, and is formed into one body with the adapter group 21. Each tray 22 is provided to be slidable (extractable) in the front and rear direction. Therefore, in conjunction with the sliding operation of the tray 22, the corresponding adapter group 21 is extracted. The tray 22 has a cover part 24 protecting one end side (outer connection end side to which the plurality of optical fibers C3 are connected) of the respective adapters 23, and support parts 25, 27 supporting the cover part 24. The cover part 24 includes a substantially quadrangular plate-like part extending in the XY plane, and a plate-like part provided on the front end edge of the part, the latter plate-like part extending in the ZX plane. The cover part 24 is caught together and supported by support parts 25, 27 provided side by side with the cover part 24 in the direction X. Further, a back end of the cover part 24 is pivotable about an axis extending in the direction X. Therefore, by sliding the tray 22 in the direction from the other end side to one end side of the adapter 23 (that is, in the front direction), and releasing a catching state of the support parts 25, 27 with respect to the cover part 24, the cover part 24 can be pivoted downward. In one example, a pivot angle of the cover part 24 is 90°. This allows the cover part 24 positioned around the outside connection end of the extracted adapter 23 to be moved, which facilitates connection of the optical fiber C3 to the connection end. When the tray 22 is slid forward, the optical connector of the optical fiber C3 connected to the connection end on the outer side of the adapter 23 may protrude forward from the front end face of the termination unit 2. Further, when the tray 22 is slid forward, the adapter 23 may be detachably provided.

Further, the tray 22 further includes a support part 26 provided in one body with a support part 27. The support part 26 is provided at a position sandwiching the support part 27 between the support part 26 and the cover part 24. The support part 26 is positioned on a side of the optical fiber housing part 12 with respect to the adapter group 21, and supports the optical fiber bundle Wb extended from the adapter group 21. In one example, the support part 26 has a flat plate shape, and has a planar shape such as a substantially fan shape as viewed from the direction Z. The optical fiber bundle Wb is located on the plate surface of support part 26. Further, the support part 26 has a guide 26a as a part guiding the optical fiber bundle Wb toward a support part 13b (see FIG. 3, described later). The guide 26a is a wall-like part provided along the outer edge of the support part 26, and prevents the optical fiber bundle Wb from falling off the support part 26.

A part 26b of the guide 26a on a side close to the support part 13b may be directed in a direction approaching the tray 22, that is, a direction slightly inclined to a negative side in the direction X with respect to the direction Y. Further, an inclination angle of the part 26b from the direction Y may be 5° to 30°. By setting the inclination angle to 5° or more, the optical fiber bundle Wb can be more easily guided toward the support part 13b. By setting the inclination angle to 30° or less, the optical fiber bundle Wb can be easily guided in a direction along the direction Y without being excessively inclined.

An optical fiber other than the optical fiber C3 may be optically connected to the second external connection portion 6 from the outside (that is, one end side of the adapter 23) of the housing 3. For example, the optical fiber (cross-connect optical fiber) for connecting the termination units 2 different from each other may be optically connected to each other. A combination of the termination units 2 different from each other may be a combination of the different termination units 2 located on one optical fiber rack 1, or a combination of the termination unit 2 located on a certain optical fiber rack 1 and the termination unit 2 located on another optical fiber rack 1.

Figure 8:
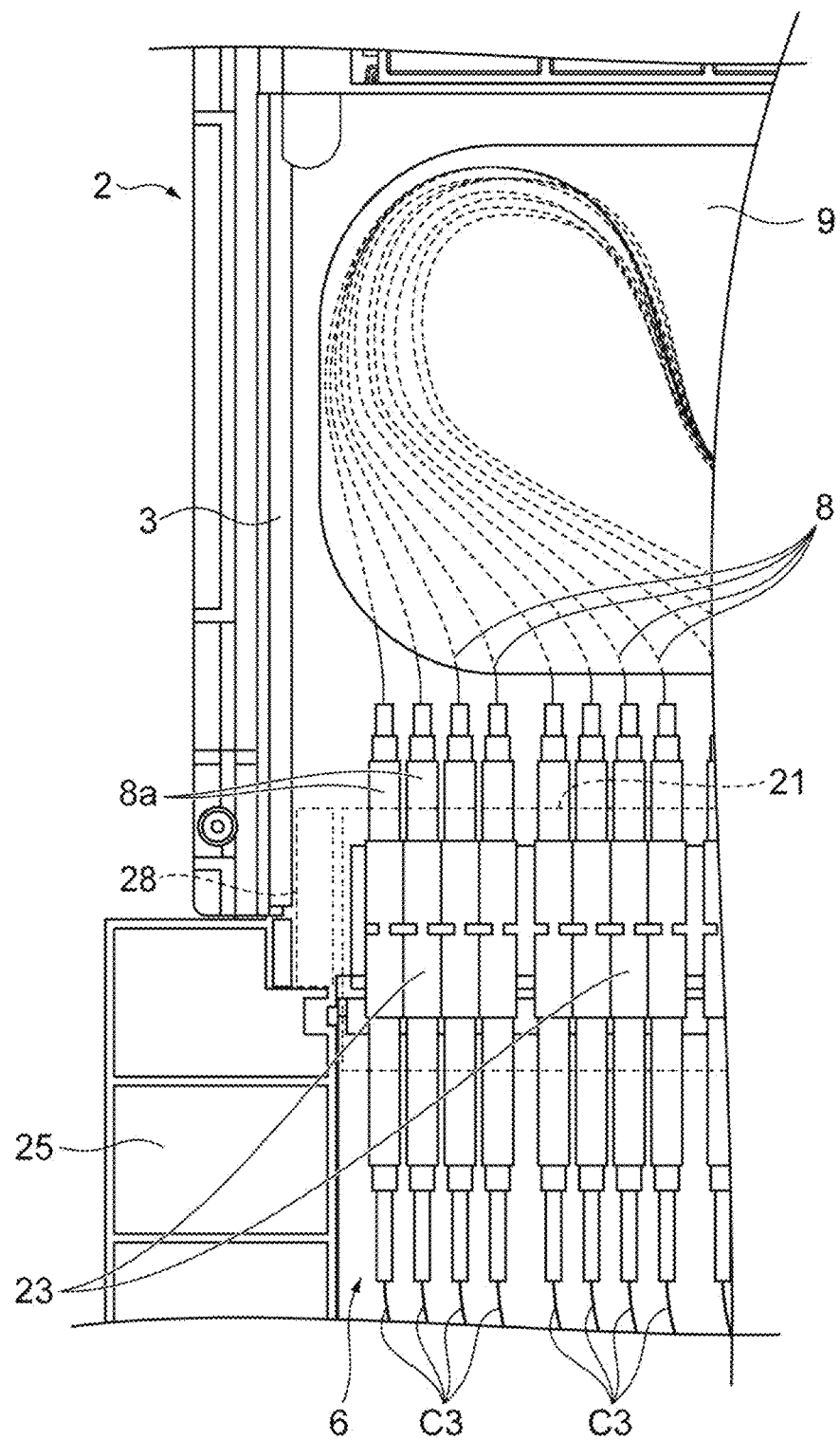
FIG. 8 is an enlarged view of a part of FIG. 6.
Figure 9:
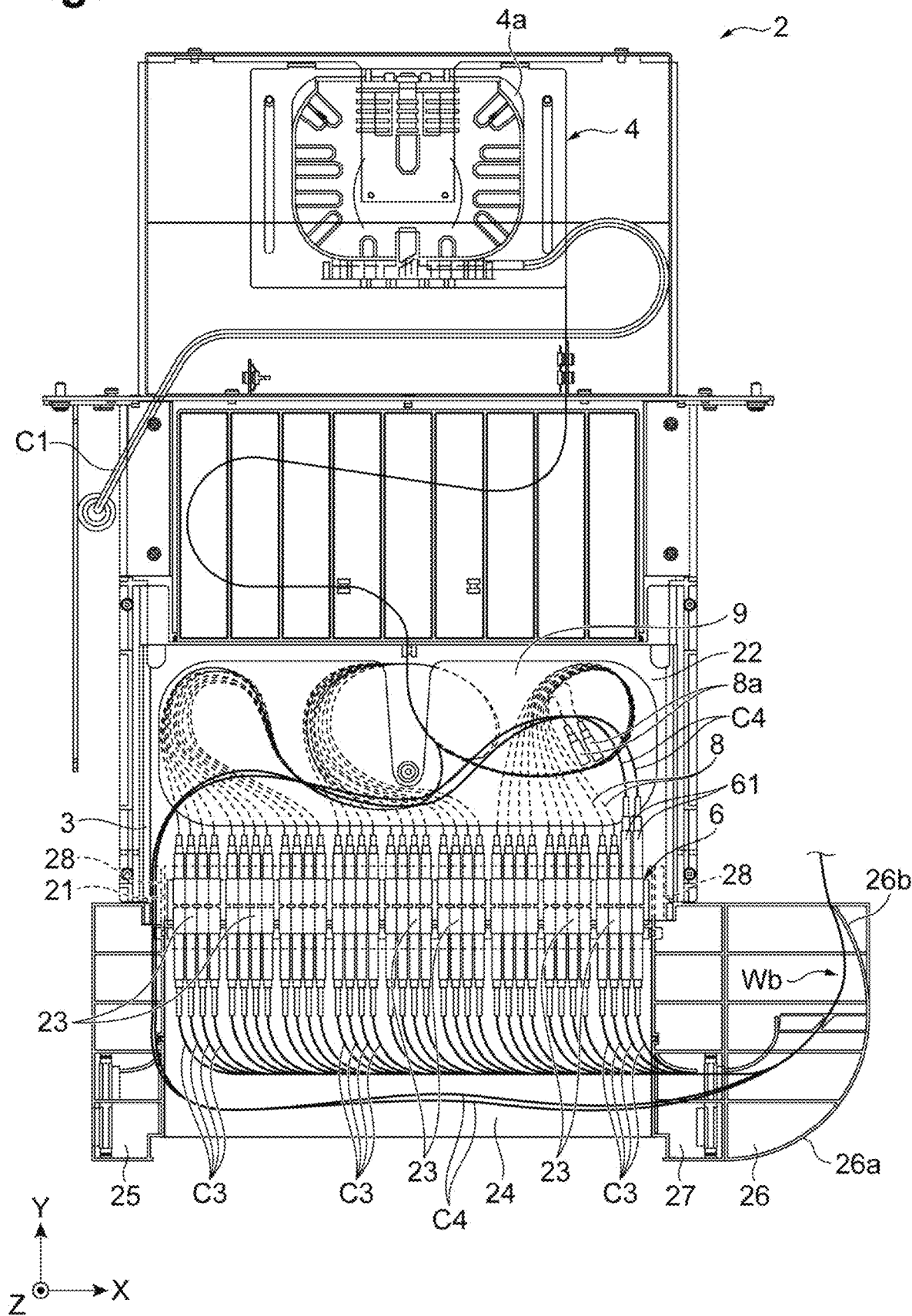
FIG. 9 is a view illustrating a state in which an optical fiber different from an optical fiber with connector optically connected to a part of adapters from an inside of the housing.

An optical fiber other than the first optical fiber 8 may be optically connected to the second external connection portion 6 from the inside (that is, other end side of the adapter 23) of the housing 3. For example, when an optical connector 8a or the like of the specific first optical fiber 8 fails, and connection failure occurs in a transmission path via the specific first optical fiber 8, an optical fiber (exchange optical fiber) other than the failed first optical fiber 8 is optically connected to the second external connection portion 6 from the inside of the housing 3. Here, an example of an aspect in which the optical fiber other than the first optical fiber 8 is optically connected from the inside of the housing 3 will be described with reference to FIG. 8 and FIG. 9. FIG. 8 is an enlarged view of a part of FIG. 6. FIG. 9 is a view illustrating a state in which an optical fiber different from the first optical fiber 8 are optically connected to a part of adapters 23 from an inside of the housing 3.

As illustrated in FIG. 6, FIG. 8, and FIG. 9, between the housing 3 and the adapter group 21 in the direction X, there is provided an optical fiber passing part 28 through which at least one optical fiber C4 can pass. The optical fiber passing part 28 is a space or a groove defined to allow the optical fiber C4 to pass therethrough, and a plurality of these are provided to sandwich the adapter group 21 in the direction X. Specifically, one optical fiber passing part 28 is provided on each outer sides of the adapter group 21 in the direction X. A dimension in the directions X and Z of the optical fiber passing part 28 may be larger than a maximum dimension of a passing optical fiber (for example, a maximum size of a connector connected to a passing optical fiber) from the viewpoint of preventing breakage of the passing optical fiber. As illustrated in FIG. 9, two optical fibers C4 pass through the optical fiber passing part 28 provided on the side of a support part 25 in the direction X.

Each optical fiber C4 is introduced into the housing 3 via the optical fiber passing part 28, and is a single optical fiber cord optically connected to the adapter 23 instead of the failed first optical fiber 8. An optical fiber part of each optical fiber C4 is protected by resin or the like, as with the optical fiber C3 and the like. A connector 61, which is provided at a tip part of the optical fiber C4 inside the housing 3, is optically connected to the adapter 23 positioned closest to a side of the support part 27 in the direction X. The optical fiber C4 on the outside of the housing 3 is bundled together with the optical fiber bundle Wb at the support part 26. Outside the optical fiber rack 1, the optical fiber C4 is optically connected to a specific optical fiber included in the optical fibers C1 of the multi fiber cable 7c. This specific optical fiber is an optical fiber connected to the failed first optical fiber 8 among the optical fibers C1, and cut outside the optical fiber rack 1. The optical fiber C4 is fusion spliced to the cut surface of the specific optical fiber outside the optical fiber rack 1. Therefore, the first optical fiber 8 having the optical connector 8a not connected to the adapter 23 as illustrated in FIG. 9 is disconnected outside the optical fiber rack 1.

As described above, each optical fiber C4 is introduced into the housing 3 via the optical fiber passing part 28 on the side of the support part 25. Moreover, each optical fiber C4 is optically connected to the adapter 23 positioned closest to the side of the support part 27. Thereby, it is possible to prevent the part housed in the housing 3 at each optical fiber C4 from being bent beyond an allowable bending radius. As described above, in the present embodiment, each optical fiber C4 is inserted into the housing 3 via the optical fiber passing part 28 apart from the adapter 23 to be connected.

The cable housing part 7 is an area in which the multi fiber cable 7c is housed, and is provided on the opposite side or the same side of the support part 26. As illustrated in FIG. 3, from a viewpoint of improving the wiring workability of the optical fiber bundle Wb in the optical fiber housing part 12, the multi fiber cable 7c may be provided on the opposite side of the optical fiber housing part 12 with the rack part 11 interposed therebetween.

The first optical fiber 8 is an assembly of single optical fiber cords. One end of the first optical fiber 8 is bundled, and housed in the fusion tray 4a. The one end is fusion spliced to the optical fiber C1 of the multi fiber cable 7c as described above. Further, an optical connector 8a is provided at the other end of the first optical fiber 8, and the optical connector 8a is connected to the other end side of the adapter 23. Usually, a part of the first optical fiber 8, which is closed to the optical connector 8a, is an element wire exposed from the outer peripheral cover. For this reason, a breakage endurance strength of the part of the first optical fiber 8 is lower than that of the optical fiber C4.

The cover sheet 9 is a transparent or colored plastic sheet protecting the optical fiber part of the first optical fiber 8. The cover sheet 9 has flexibility, and covers most of a branched part of the first optical fiber 8 in the housing 3. When the optical fiber C4 and the like are introduced from the outside to the inside of the housing 3 via the optical fiber passing part 28, the optical fiber C4 and the like housed in the housing 3 are arranged on the cover sheet 9. Accordingly, it is possible to prevent the optical fiber C4 and the like from directly contacting the first optical fiber 8, and to suppress breakage of the first optical fiber 8 caused by the optical fiber C4 and the like. the cover sheet 9 may be transparent or translucent so that the first optical fiber 8 at the bottom and the like can be visually recognized through the cover sheet 9. An example of the material of the cover sheet 9 includes plastic, but is not limited thereto.

Figure 10:
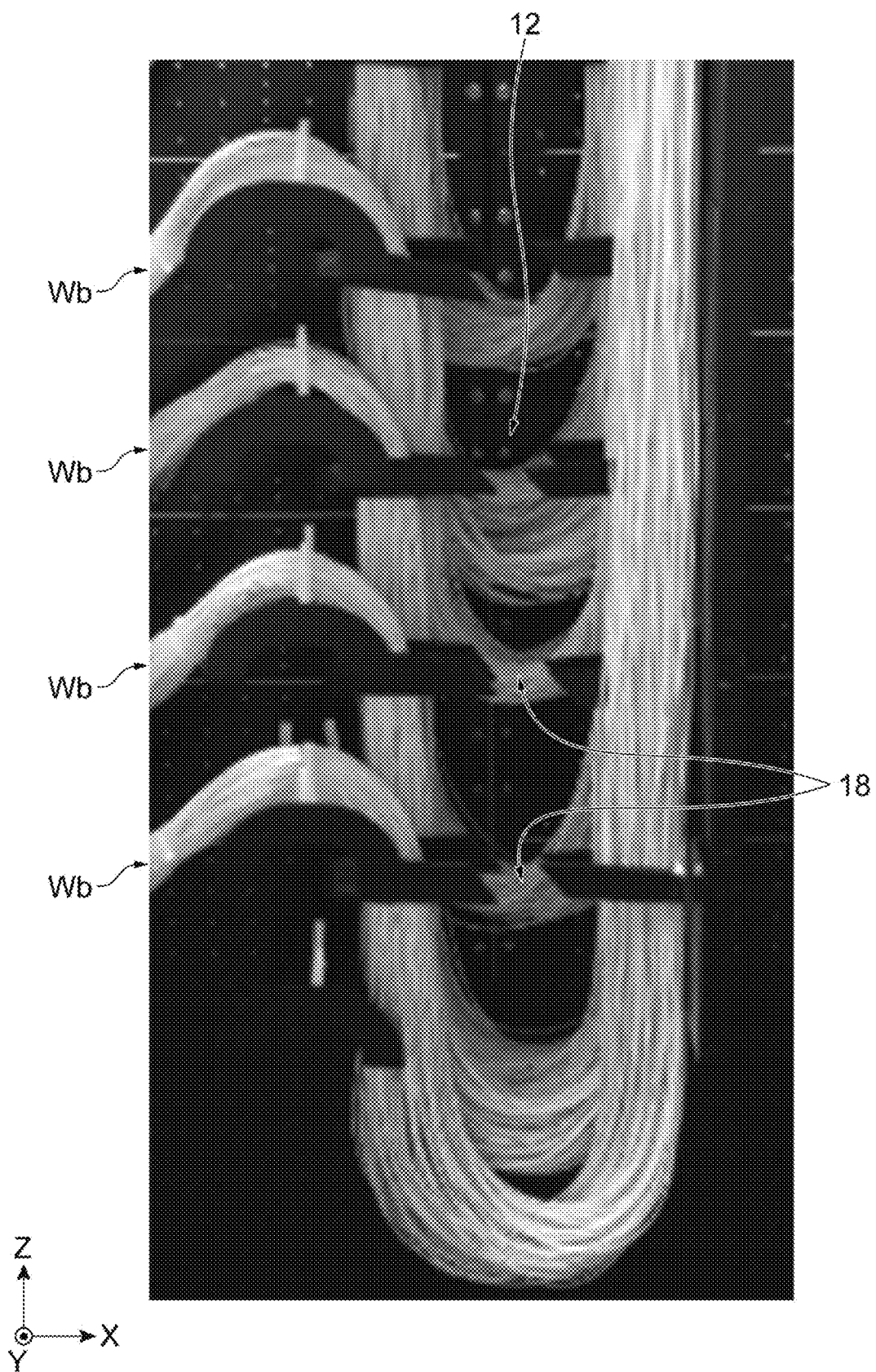
FIG. 10 is a photograph showing a state in which an extra length wiring part of an optical fiber bundle is housed in an optical fiber housing part.

Returning to FIG. 1 to FIG. 4, the optical fiber housing part 12 is positioned next to the rack part 11 in the direction X and houses an extra length wiring part of the optical fiber bundle Wb (see FIG. 6) connected to the termination unit 2. In the optical fiber housing part 12, each of the plurality of optical fiber bundles Wb is divided by the plurality of first dividing members 18 and the second dividing member 19. FIG. 10 is a photograph showing a state in which the extra length wiring part of the optical fiber bundle Wb is housed in the optical fiber housing part 12. As shown in FIG. 10, the extra length wiring part of the optical fiber bundle Wb is housed in a hanging state, for example, assuming a U shape. In the optical fiber housing part 12, the extra length wiring part of the optical fiber C4 may also be housed in the same manner as the optical fiber bundle Wb.

The partition plate 13 is a plate-like member provided to partition the optical fiber housing part 12 in the front and rear direction in the direction Y. The partition plate 13 is fixed by, for example, the bottom frame part 1a, the vertical frame part 1b, and the top frame part 1d. The partition plate 13 includes a plurality of openings 13a, a plurality of thin plate-like support part 13b (second support part), and a cable housing part 13x. The plurality of openings 13a are provided so that, for example, the optical fiber is directed from a front side of the partition plate 13 to a back side, or the optical fiber is directed from the back side to the front side of the partition plate 13. The plurality of openings 13a are provided in a line in the direction Z.

The support part 13b is a plate-like member supporting the optical fiber bundle Wb extending from the support part 26 (see FIG. 6) of the corresponding termination unit 2 to the optical fiber housing part 12. The support part 13b is provided side by side with the support part 26 in the direction Y, and in the present embodiment, it is provided behind the support part 26. The support part 13b is separate from the tray 22, and does not work in conjunction with the sliding operation of the tray 22. In one example, the support part 13b is attached to a surface of the partition plate 13. The support part 13b is provided on a side of the rack part 11 than an opening 13a. From the viewpoint of preventing inhibition of the sliding operation of the tray 22 by the optical fiber bundle Wb, the extra length wiring part of the optical fiber bundle Wb is provided on the support part 13b.

The support part 13b has a flat surface on which the optical fiber bundle Wb is located and supports the optical fiber bundle Wb in a freely extendable and bendable manner. In addition, since the support part 13b has a flat plate shape, a flat surface of the support part 13b extends to an edge of the support part 13b on the side of the optical fiber housing part 12. In other words, the wall-like part like the guide 26a of the support part 26 is not provided on the edge of the support part 13b on the side of the optical fiber housing part 12.

Returning to FIG. 1 to FIG. 4 again, the cable housing part 13x is an area housing the local fusion cable 13c and is attached to a back surface of the partition plate 13, for example, via a fixing member 13d. The cable housing part 13x extends in the direction Z from the vicinity of the bottom frame part 1a to beyond the top frame part 1d via an opening 1e provided in the top frame part 1d, for example.

The lateral plate 14 is a plate-like member provided to partition the optical fiber racks 1 in the direction X. The lateral plate 14 is positioned on the opposite side of the rack part 11 with the optical fiber housing part 12 interposed therebetween, and is fixed to the bottom frame part 1a and the vertical frame part 1b or the partition plate 13.

The plurality of rails 15 are members guiding the optical fiber laid on a back side of the partition plate 13. Each of the plurality of rails 15 has a substantially U-shaped groove shape extending in the direction X. One end of each rail 15 is attached to the vertical frame part 1b, and the other end of each rail 15 is attached to the vertical frame part 1c. The one end and the other end of the rail 15 have shapes connectable with each other. Therefore, when arranging the optical fiber racks 1 in the direction X, it is possible to connect the rails 15 of the adjacent optical fiber racks 1 to each other. Further, in the direction Y, the rail 15 is apart from the partition plate 13 and the cable housing part 13x. Therefore, it is possible to suitably suppress contact between the optical fiber laid on the rail 15, and the optical fiber C2 housed in the local fusion cable 13c in the cable housing part 13x.

The rail 15 has a main part 15a extending in the direction X, a branch part 15b branching and extending from the main part 15a, and a disconnect part 15c in which a part of the main part 15a is disconnected. The branch part 15b is a part extending from the main part 15a in the direction Y toward the corresponding opening 13a. The disconnect part 15c is provided on a back side of the optical fiber housing part 12 with the partition plate 13 interposed therebetween. The disconnect parts 15c are arranged in a line in the direction Z. In the main part 15a, a part forming the disconnect part 15c is curved toward the bottom frame part 1a. By forming such a disconnect part 15c, an optical fiber (for example, cross-connect optical fiber) positioned on the back side of the partition plate 13 can be laid on a plurality of rails, and the extra length wiring part of the optical fiber can be provided. In other words, on the back side of the optical fiber housing part 12 with the partition plate 13 interposed therebetween, a housing part S (second optical fiber housing part) in which the extra length wiring part of the optical fiber different from the optical fiber C3 in the optical fiber bundle Wb is housed can be provided.

The trays 16a and 16b are members locating the extra length wiring part of the optical fiber positioned on the back side of the partition plate 13 and are attached to the back surface of the partition plate 13. A tray 16a is provided between the disconnect part 15c of the rail 15 closest to the bottom frame part 1a in the direction Z, and the bottom frame part 1a. Thus, on the tray 16a, the extra length wiring part of the optical fiber provided on the disconnect part 15c can be located. Further, a tray 16b is provided between a lower area of the cable housing part 13x, and the bottom frame part 1a in the direction Z. Therefore, on the tray 16b, an extra length wiring part of the optical fiber C2 housed in the local fusion cable 13c extending from the cable housing part 13x to the termination unit 2 can be located.

Figure 11:
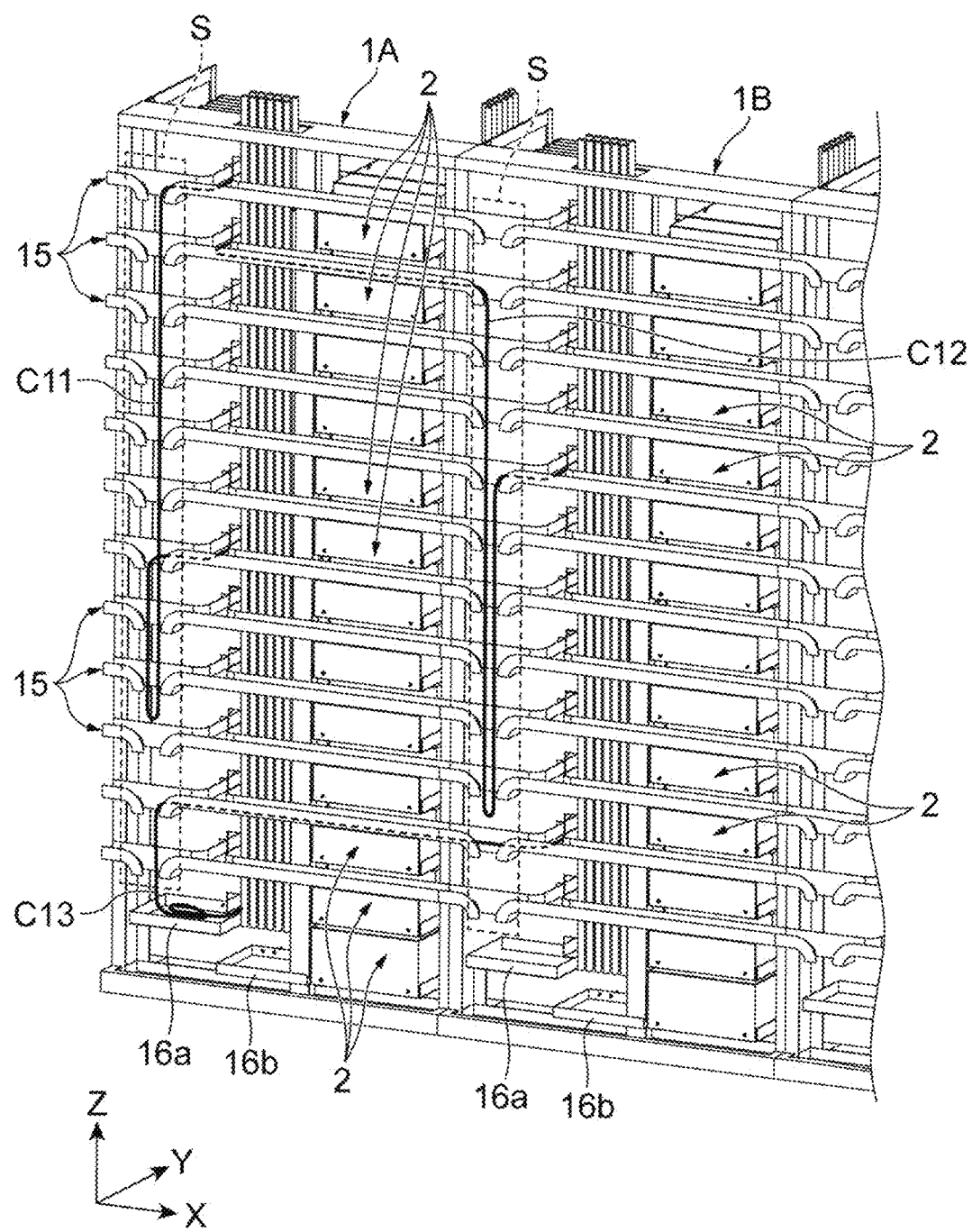
FIG. 11 is a diagram illustrating an example in which cross-connect optical fibers are laid.

FIG. 11 is a diagram illustrating an example in which the cross-connect optical fibers are laid. In the optical fiber rack 1 illustrated in FIG. 11, the rack positioned at the extreme end in the direction X is an optical fiber rack 1A and the rack adjacent to the optical fiber rack 1A is an optical fiber rack 1B. FIG. 11 illustrates the cross-connect optical fibers C11 to C13 laid on the rail 15. The cross-connect optical fiber C11 optically connects the different termination units 2 of the optical fiber rack 1A to each other. Specifically, the cross-connect optical fiber C11 optically connects the second external connection portion 6 of the termination unit 2 positioned at the uppermost position in the optical fiber rack 1A, and the second external connection portion 6 of the termination unit 2 positioned at the seventh position from the top in the optical fiber rack 1A. In the housing part S of the optical fiber rack 1A, an extra length wiring part of the cross-connect optical fiber C11 is formed. Further, the cross-connect optical fibers C12 and C13 optically connect the termination unit 2 located on the optical fiber rack 1A, and the termination unit 2 located on the optical fiber rack 1B. Specifically, the cross-connect optical fiber C12 optically connects the second termination unit 2 from the top in the optical fiber rack 1A, and the fifth termination unit 2 from the top in the optical fiber rack 1B. On the other hand, the cross-connect optical fiber C13 optically connects the second termination unit 2 from the bottom in the optical fiber rack 1A, and the fourth termination unit 2 from the bottom in the optical fiber rack 1B. In the housing part S of the optical fiber rack 1B, an extra length wiring part of the cross-connect optical fiber C12 is formed. Further, on the tray 16a of the optical fiber rack 1A, an extra length wiring part of the cross-connect optical fiber C13 is located.

Figure 12:
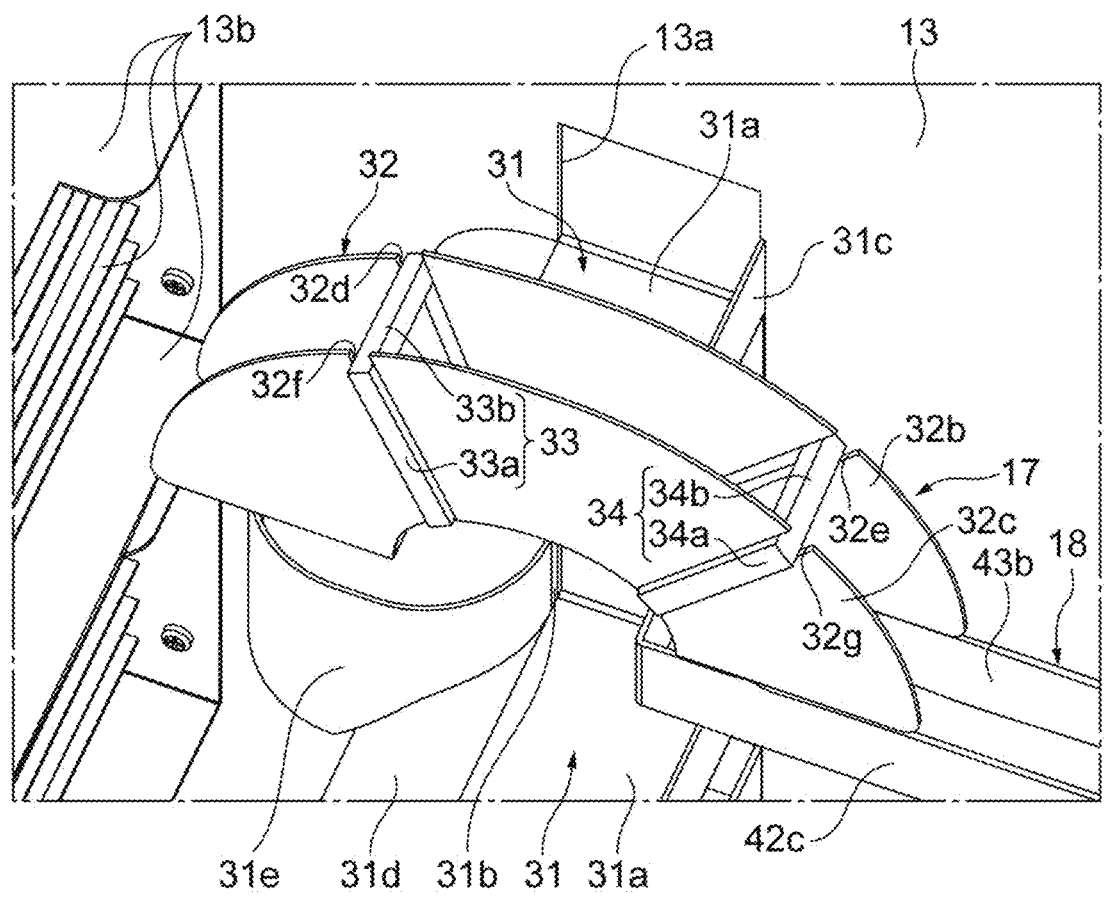
FIG. 12 is an enlarged perspective view of an optical fiber guide.
Figure 13:
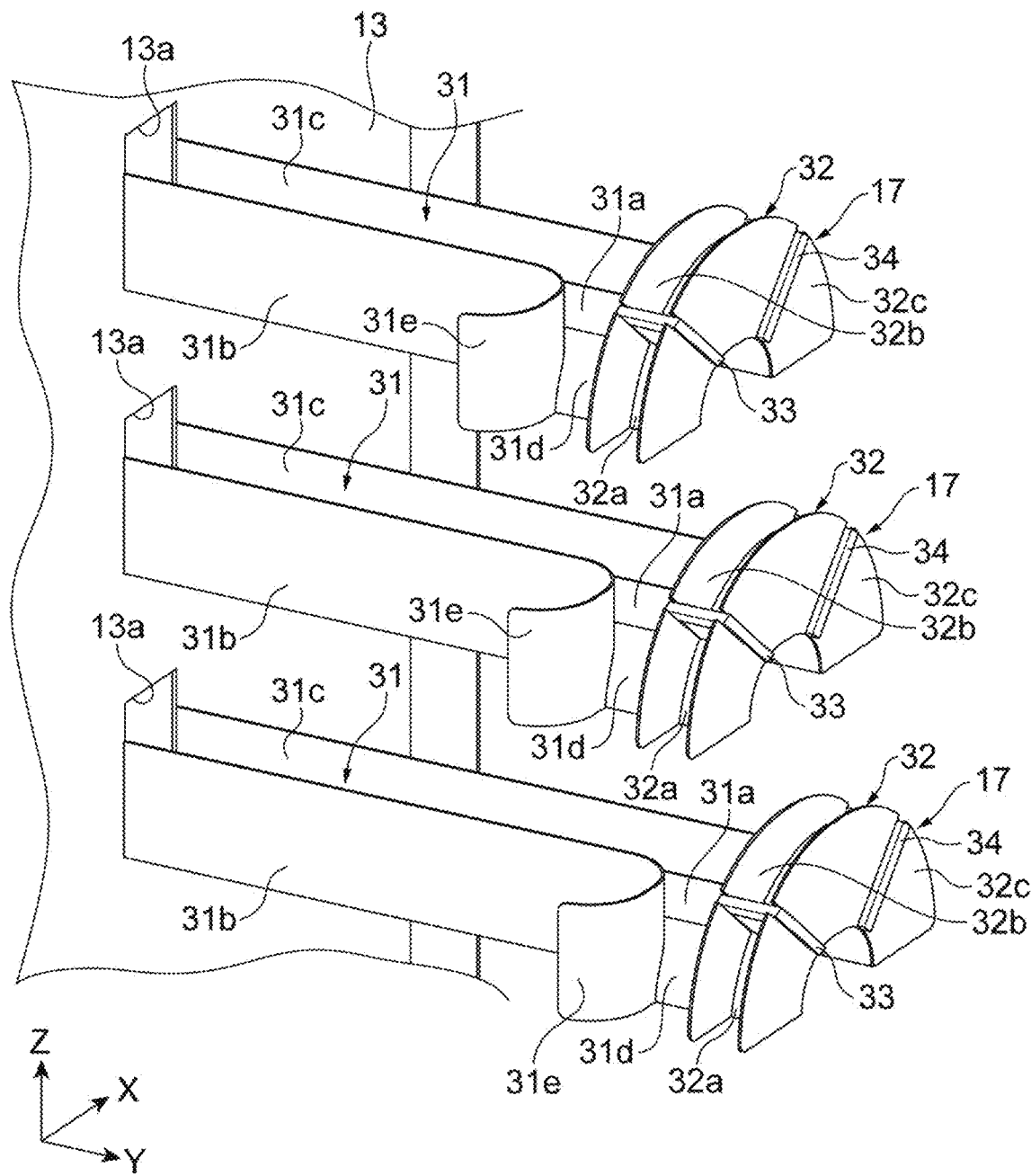
FIG. 13 is an enlarged view of a main part of the optical fiber guide.

Returning to FIG. 1 to FIG. 4, the plurality of optical fiber guides 17 are members guiding the optical fiber connected to the second external connection portion 6 of the termination unit 2 to the optical fiber housing part 12, and are attached to the surface of the partition plate 13 between the support part 13b and the optical fiber housing part 12. The optical fiber guides 17 are arranged in the direction Z to correspond to the termination units 2. Here, configuration of the optical fiber guide 17 will be described with reference to FIG. 12 and FIG. 13. FIG. 12 is an enlarged perspective view of the optical fiber guide 17, and FIG. 13 is a diagram in which a part of the optical fiber guide 17 is extracted. As illustrated in FIG. 12 and FIG. 13, the optical fiber guide 17 includes a guide part 32 (first guide part) housing the optical fiber C3 (for example, optical fiber bundle Wb) directed to the optical fiber housing part 12, a guide part 31 (second guide part) housing optical fiber (for example, cross-connect optical fiber which is the second optical fiber) passing through the opening 13a of the partition plate 13, and a restriction part 33 restricting motion of the optical fiber C3 in the direction Z.

The guide part 31 is a part to be attached to the surface of the partition plate 13. More specifically, the guide part 31 is a part attached to the surface of the partition plate 13 near the corresponding opening 13a. The guide part 31 has a substantially U-shaped groove shape extending in the direction Y. The guide part 31 has a bottom part 31a, a sidewall part 31b positioned on the side of the rack part 11, and a sidewall part 31c positioned on the side of the optical fiber housing part 12. At least a part of the sidewall part 31b of the guide part 31 is cut out. Further, a slope part 31d extending toward the side of the rack part 11 in the direction X is provided from the bottom part 31a where the sidewall part 31b is not provided in the guide part 31. The slope part 31d is curved downward in the direction X from the bottom part 31a toward the rack part 11. A curved plate 31e restricting the position of the optical fiber is provided at the front end part of the sidewall part 31b. The curved plate 31e is curved to guide the second optical fiber to the guide part 31. The curved plate 31e is a plate-like member curved toward the front side as viewed from the direction Z. A curvature radius of the curved plate 31e viewed from the direction Z is larger than the allowable bending radius of the optical fiber guided by the guide part 31, for example. In this case, a part of the optical fiber in contact with the curved plate 31e can be prevented from bending to exceed the allowable bending radius to be broken.

The length of each guide part 31 in the direction Y is not uniform but vary. Specifically, as the optical fiber guide 17 provided further downward in the direction Z, a dimension of the guide part 31 in the direction Y is longer. For example, the dimension in the direction Y of each guide part 31 is adjusted so that the guide parts 32 do not overlap each other in the direction Z.

The guide part 32 is a part provided at the leading end of the guide part 31 in the direction Y, and has a substantially U-shaped groove shape extending to cross the guide part 31. The guide part 32 has a bottom part 32a, a sidewall part 32b (wall part) positioned on the side of the guide part 31, and a sidewall part 32c positioned on the opposite side of the sidewall part 32b via the bottom part 32a. The bottom part 32a is curved upward as viewed from the direction Y. A curvature radius of the bottom part 32a viewed from the direction Y is larger than the allowable bending radius of the optical fiber in the optical fiber bundle Wb, for example. The sidewall part 32b is provided to partition between the guide part 31 and the guide part 32. Specifically, the sidewall part 32b is provided to partition not only between the bottom parts 31a and 32a, but also between the slope part 31d and the bottom part 32a. The sidewall parts 32b and 32c are provided along the shape of the bottom part 32a, and have substantially the same shape. A slit 32d is provided on the side of the rack part 11 of the sidewall part 32b, and a slit 32e is provided on the side of the optical fiber housing part 12 of the sidewall part 32b. Similarly, a slit 32f is provided on the side of the rack part 11 of the sidewall part 32c, and a slit 32g is provided on the side of the optical fiber housing part 12 of the sidewall part 32c. The slits 32d and 32f are provided to face each other in the direction Y, and the slits 32e and 32g are provided to face each other in the direction Y.

Each of the restriction part 33 and the restriction part 34 is a member that restricts motion of the optical fiber bundle Wb housed in the guide part 32 in the direction Z. The restriction part 33 is provided to be housed in the slits 32d and 32f, and has a substantially rectangular frame shape. The restriction part 33 has a main body part 33a having a substantially U shape, and a bar-like member 33b attached to the upper end of the main body part 33a. The main body part 33a is housed in the slits 32d and 32f to be substantially U-shaped as viewed from the direction X. One end of the bar-like member 33b is pivotably attached to one upper end part of the main body part 33a, and the other end of the bar-like member 33b is caught together the other upper end part of the main body part 33a. For example, the other end of the bar-like member 33b is inserted into a groove provided in the other upper end part of the main body part 33a, thereby the restriction part 33 constitutes a frame shape. the restriction part 33 may have a means (for example, claw part or the like) to be fixed to the guide part 32. The restriction part 34 has the same function and shape as the restriction part 33, and is housed in the slits 32e and 32g. Therefore, the restriction part 34 has a main body part 34a having a substantially U shape, and a bar-like member 34b attached to the upper end of the main body part 34a. The motion of the optical fiber bundle Wb in the direction Z is restricted so that the optical fiber bundle Wb is laid in the direction X and the direction Y, and as a result, the motion of the optical fiber bundle Wb in the direction along the guide part 32 is restricted.

Here, an example of a method of using the restriction part 33 will be described. First, the main body part 33a of the restriction part 33 is housed in the slits 32d and 32f. Next, the optical fiber bundle Wb is housed on the bottom part of the main body part 33a. At this time, by releasing the catching state of the other end of the bar-like member 33b to the main body part 33a, the optical fiber bundle Wb can be easily housed in the main body part 33a. Next, the bar-like member 33b is caught together the main body part 33a. Thereby, the optical fiber bundle Wb is housed in the space defined by the restriction part 33, and motion of the optical fiber bundle Wb in the direction Z can be restricted. The restriction part 34 may be used in the same manner as the restriction part 33.

The number of restriction parts may be one, but there may be at least two restriction parts. In a case of adding the optical fiber to the optical fiber bundle Wb or decreasing the optical fiber from the optical fiber bundle Wb, the optical fiber bundle Wb may be held to prevent unexpected stress thereon by moving the optical fiber bundle Wb already housed by its own weight when releasing the restriction part. In such a case, if there are at least two restriction parts, even if one restriction part is released unless the other is released, the optical fiber bundle Wb can be continuously held. For example, in the case where there are two restriction parts, after one restriction part is uncoupled to release a part of the optical fiber from one restriction part, the one restriction part is caught together to hold the optical fiber bundle Wb, and then, the other restriction part is uncoupled to release the part of the optical fiber from the other restriction part, so that the part of the optical fiber can be separated from the optical fiber bundle Wb. On the other hand, the optical fiber bundle Wb except for the optical fiber to be separated continuously keeps a state of being caught together to prevent an unexpected stress from applying. When adding the optical fiber, in a reverse procedure to the above, after one restriction part is uncoupled to catch together the optical fiber bundle Wb including the optical fiber to be added by one restriction part, the other restriction part may be released from the catching state to catch together the optical fiber bundle Wb including the optical fiber to be added by the other restriction part.

Figure 14:
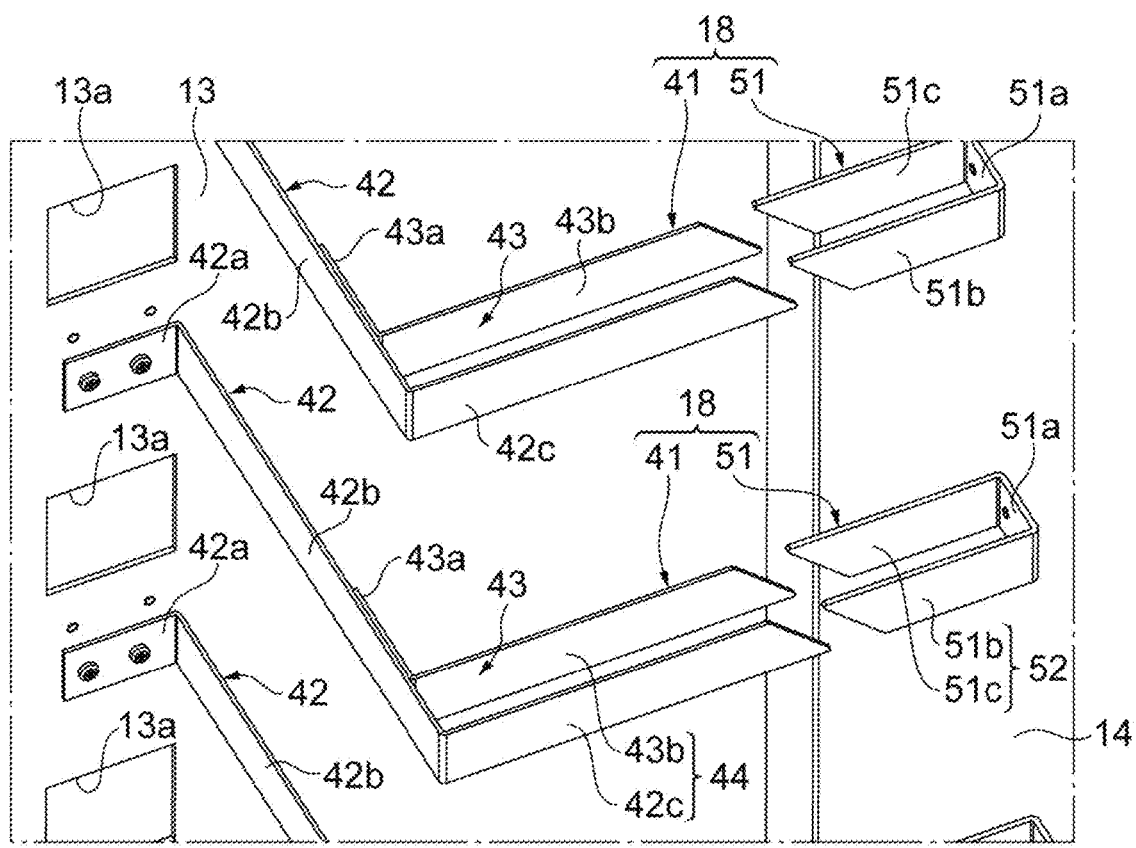
FIG. 14 is an enlarged view of a main part of a first dividing member.
Figure 15:
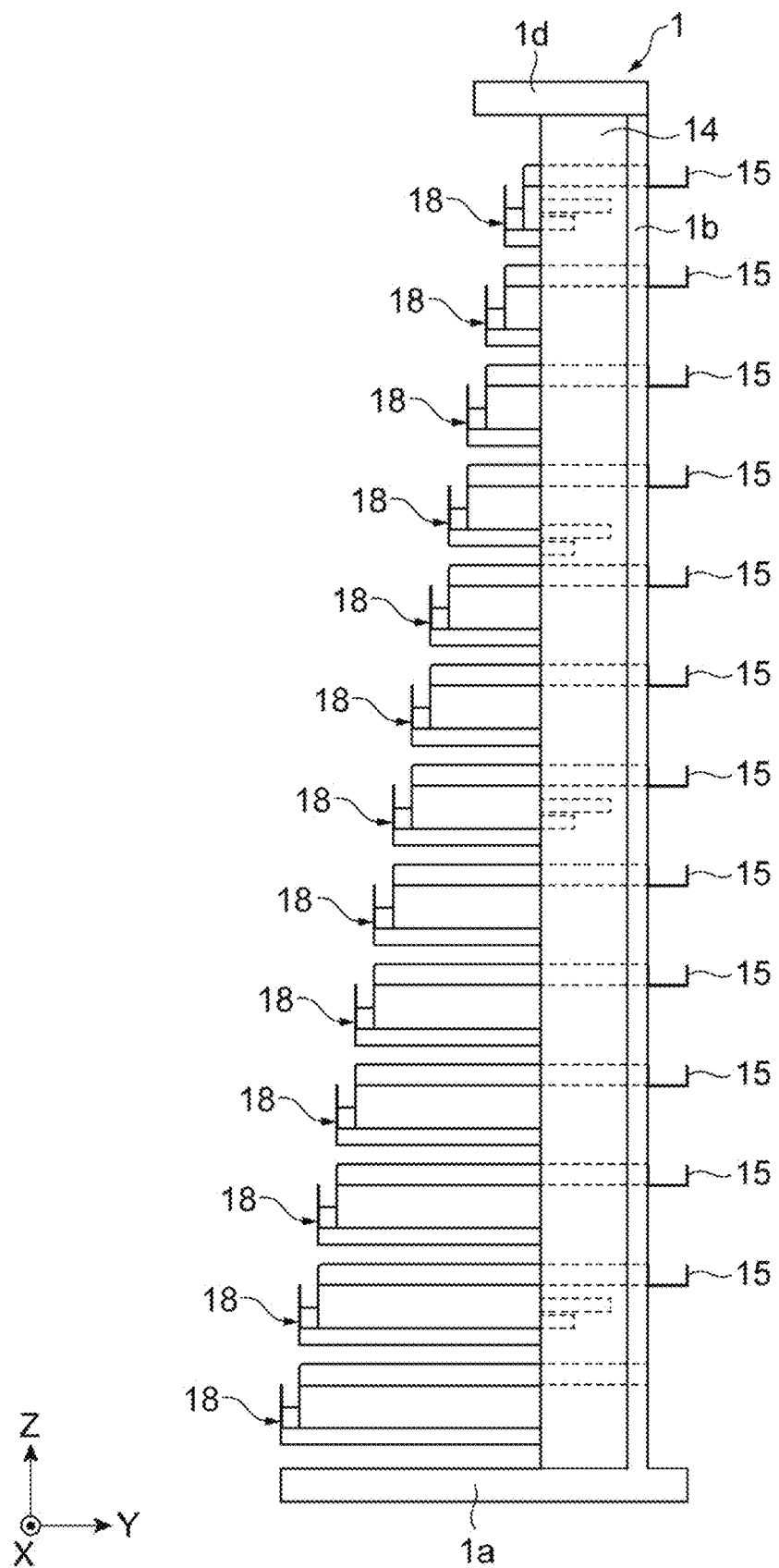
FIG. 15 is a schematic diagram of the optical fiber housing part as viewed in a direction X from a side of a lateral plate.

FIG. 14 is a diagram in which a part of the first dividing member is extracted. FIG. 15 is a schematic diagram of the optical fiber housing part 12 as viewed in the direction Y from the lateral plate 14 side. As also illustrated in FIG. 10, each of the first dividing members 18 illustrated in FIG. 15 is a member dividing the positions of the optical fiber bundle Wb in the optical fiber housing part 12. The plurality of first dividing members 18 are arranged side by side with the corresponding optical fiber guides 17 in the direction Z in the optical fiber housing part 12, respectively. As illustrated in FIG. 15, as a first dividing member 18 provided more downward in the direction Z, the first dividing member 18 is positioned more forward in the direction Y in common with the optical fiber guide 17. Each of the first dividing members 18 has a first dividing body 41 attached to the surface of the partition plate 13, and a second dividing body 51 attached to the lateral plate 14.

The first dividing body 41 is a member for dividing a part introduced into the optical fiber housing part 12 from the optical fiber guide 17, the part being in the optical fiber bundle Wb housed in the optical fiber housing part 12. The first dividing body 41 is composed of a first bar-like member 42 and a second bar-like member 43, for example. The first bar-like member 42 includes a flange part 42a fastened to the surface of the partition plate 13 via a fastening member such as screw, a middle part 42b extending in the direction Y from an end of the flange part 42a on the side of the lateral plate 14 in the direction X, and a dividing part 42c (one first dividing bar) crossing the direction Y from a forward end of the middle part 42b and extending toward the lateral plate 14. The flange part 42a, the middle part 42b, and the dividing part 42c are provided by bending a member having a bar-like shape, for example. The flange part 42a is fastened below the corresponding optical fiber guide 17. As the middle part 42b provided more downward in the direction Z, a dimension in the direction Y is longer. In the embodiment, the dividing part 42c extends in the direction X.

The second bar-like member 43 includes a flange part 43a joined to the middle part 42b, and a dividing part 43b (the other first dividing bar) extending from an end of the flange part 43a on the side of the dividing part 42c in a direction crossing the direction Y. The flange part 43a and the dividing part 43b are provided by bending a member having a bar-like shape, for example. The flange part 43a is joined to a surface of the middle part 42b facing the lateral plate 14 with an adhesive or the like, for example. The dividing part 43b is positioned closer to the side of the partition plate 13 than the dividing part 42c in the direction Y, and is apart from the dividing part 42c in the direction Y.

The first dividing body 41 is continuously connected to the tip part of the guide part 32 of the corresponding optical fiber guide 17, the tip part being located on the side of the optical fiber housing part 12. More specifically, as illustrated in FIG. 12, the dividing part 42c is continuously connected to the tip part of the sidewall part 32c on the side of the optical fiber housing part 12, and the dividing part 43b is continuously connected to the tip part of the sidewall part 32b on the side of the optical fiber housing part 12. Accordingly, the optical fiber bundle Wb guided by the guide part 32 is easily divided by the first dividing body 41 in the optical fiber housing part 12 because the guide part 32 and the dividing parts 42c and 43b are formed in one body.

The second dividing body 51 is a member for dividing the optical fiber bundle Wb to be housed in the optical fiber housing part 12 and provided to be opposite to and apart from the first dividing body 41 in the direction X. The second dividing body 51 is provided by bending a member having a bar-like shape into a substantially U shape, for example. The second dividing body 51 includes a base part 51a joined to the lateral plate 14, a dividing part 51b (one second dividing bar) extending from one end of the base part 51a in the direction Y toward the first dividing body 41, and a dividing part 51c (the other second dividing bar) extending from the other end of the base part 51a in the direction Y toward the first dividing body 41. The base part 51a is fixed to the lateral plate 14 via a screw or the like, for example. The fixing position of the base part 51a is adjusted depending on the position of the corresponding first dividing body 41 in the direction Y.

The dividing parts 51b and 51c are bar-like parts provided apart from each other in the direction Y. The dividing part 51b is positioned forward of the dividing part 51c in the direction Y. In the direction X, the dividing part 51b is provided to be opposite to and apart from the dividing part 42c of the first bar-like member 42. In addition, the dividing part 51c is provided to be opposite to and apart from the dividing part 43b of the second bar-like member 43 in the direction X. The dividing part 51b may be provided on an extended line of the dividing part 42c, and the dividing part 51c may be provided on an extended line of the dividing part 43b.

The second dividing member 19 is a member for dividing a part of each of the plurality of optical fiber bundles Wb, the part extending outward from the optical fiber housing part 12. The second dividing member 19 is composed of a plurality of plate-like fragments arranged in the direction Y to be apart from each other. The second dividing member 19 is provided near the upper end of the lateral plate 14.

Next, an example of an optical fiber exchange method in which the termination unit 2 is changed from a state (see FIG. 6) where the first optical fiber 8 is inserted into each adapter 23 to a state (see FIG. 9) in which the optical fiber C4 is inserted from the inside of the housing 3 to a part of the adapters 23, will be described with reference to FIG. 16.

Figure 16:
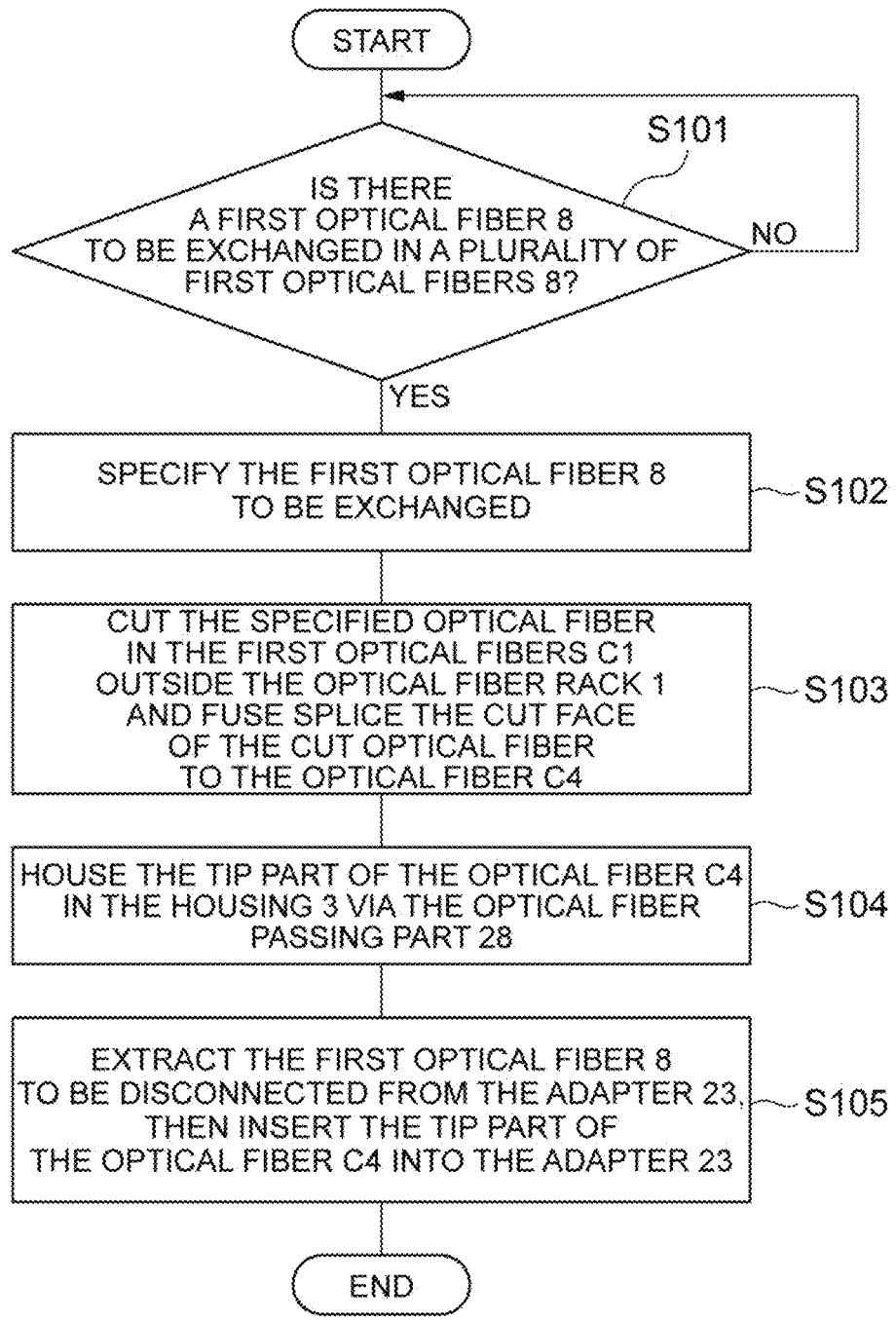
FIG. 16 is a flow chart for explaining an optical fiber exchange method housed in the termination unit.

As illustrated in FIG. 16, first, it is confirmed whether there is a first optical fiber 8 to be exchanged from the plurality of first optical fibers 8 (step S101). In step S101, for example, it is confirmed whether there is a first optical fiber 8 in which a connection failure has occurred due to breakage of the optical connector 8a or the like. For example, by monitoring an optical signal output from each optical fiber C3, presence or absence of a connection failure is confirmed. When it is judged that there is no first optical fiber 8 in which a connection failure has occurred (step S101: NO), step S101 is executed again after a predetermined period.

Next, when it is judged that there is a first optical fiber 8 having a connection failure (step S101: YES), the first optical fiber 8 to be exchanged is specified (step S102). In step S102, after specifying the first optical fiber 8 in which a connection failure has occurred, the optical fiber included in the optical fibers C1 and connected to the specified first optical fiber 8 is specified. The specified optical fiber in the optical fibers C1 of the multi fiber cable 7c may be also referred to as a third optical fiber.

Next, outside the optical fiber rack 1, the specified optical fiber in the optical fibers C1 is cut, and the cut face of the specified optical fiber is fusion spliced to the optical fiber C4 (step S103, fusion splicing step). In step S103, first, using the optical fiber cord cutter or the like, the specified optical fiber in the optical fibers C1 is cut outside the optical fiber rack 1. A part to be cut in the specified optical fiber is a part positioned outside the optical fiber rack 1 from the beginning, and is set so as not to include a damaged part or the like between the fusion rack and the cut surface. Then, using a fusion splicer or the like, the cut face of the specified optical fiber extending from the fusion rack is fusion spliced to one end of the optical fiber C4. In step S103, cutting is not performed except for the specified optical fiber in the optical fibers C1. Therefore, except for the specified optical fiber, the optical connection between the optical fibers C1 and the first optical fibers 8 are maintained.

Next, the tip part of the optical fiber C4 is housed in the housing 3 via the optical fiber passing part 28 (step S104, housing step). In step S104, first, as with the optical fiber bundle Wb, the extra length wiring part of the optical fiber C4 is housed in the optical fiber housing part 12. Then, the tip part of the optical fiber C4 is drawn over the support part 26 and passed through the optical fiber passing part 28 from the front end side of the housing 3 where the optical fiber C3 is provided. Accordingly, the tip part of the optical fiber C4 is housed in the housing 3. The tip part of the housed optical fiber C4 is housed in the housing 3 with the extra length wiring part ensured. The tip part of the optical fiber C4 is an end part (the other end) not fusion spliced to the specified optical fiber of the optical fibers C1 at the optical fiber C4, and a part where the connector 61 is attached.

Next, after extracting the first optical fiber 8 to be disconnected from the adapter 23 in step S103, the tip part of the optical fiber C4 is inserted into the adapter 23 (step S105, connection exchange process). In step S105, first, the optical connector 8a of the cut first optical fiber 8 is extracted from the adapter 23. Then, the connector 61 of the optical fiber C4 is inserted into the connection portion opened in the adapter 23. Thus, by exchanging the optical fiber in which the connection failure occurs, the connection failure is solved. The cut first optical fiber 8 may be left in the housing 3. Thereby, a step or the like for taking out the first optical fiber 8 becomes unnecessary.

The effect obtained by the termination unit 2 according to the present embodiment described above will be described. The termination unit 2 includes an optical fiber passing part 28 provided between the housing 3 and the adapter group 21 in the direction X, and through which at least one optical fiber C4 can pass. For this reason, for example, when a connection failure occurs due to the specific first optical fiber 8 in the first optical fibers 8 provided in the housing 3, it is possible to easily house the exchange optical fiber C4 with respect to the specific first optical fiber 8 in the housing 3 from the same side as the optical fiber C3 via the optical fiber passing part 28. Thereby, without taking out only the specific first optical fiber 8 from the housing 3, it is possible to extract the specific first optical fiber 8 from the adapter 23 and to insert the exchange optical fiber C4 into the adapter 23. Therefore, by using the termination unit 2, in the optical fiber rack 1, it is possible to easily fix a connection failure caused by the specific first optical fiber 8 in the housing 3.

In addition, in the present embodiment, the second external connection portion 6 including the adapter group 21 is provided on the front end side of the housing 3. Here, as illustrated in FIG. 1 or the like, the entire front end of the housing 3 is exposed from the optical fiber rack 1. Therefore, even after arranging the optical fiber rack 1 on which the termination unit 2 is located, housing the optical fiber C4 in the housing 3 will be easier than housing performed from a position other than the front end of the housing 3.

A plurality of optical fiber passing parts 28 may be provided to sandwich the adapter group 21 in the direction X. Therefore, the optical fiber C4 is allowed to pass through the optical fiber passing part 28 which is apart from the first optical fiber 8 to be exchanged. It is possible to suppress the optical fiber C4 in the housing 3 from bending to exceed the allowable bending deformation. It is possible to suppress the breakage of the tip part housed in the housing 3 at the optical fiber C4.

The termination unit 2 includes a cover sheet 9 for protecting the optical fiber part of the plurality of first optical fibers 8 in the housing 3. For this reason, it is possible to suppress breakage of the plurality of first optical fibers 8 by the optical fiber C4.

Figure 17:
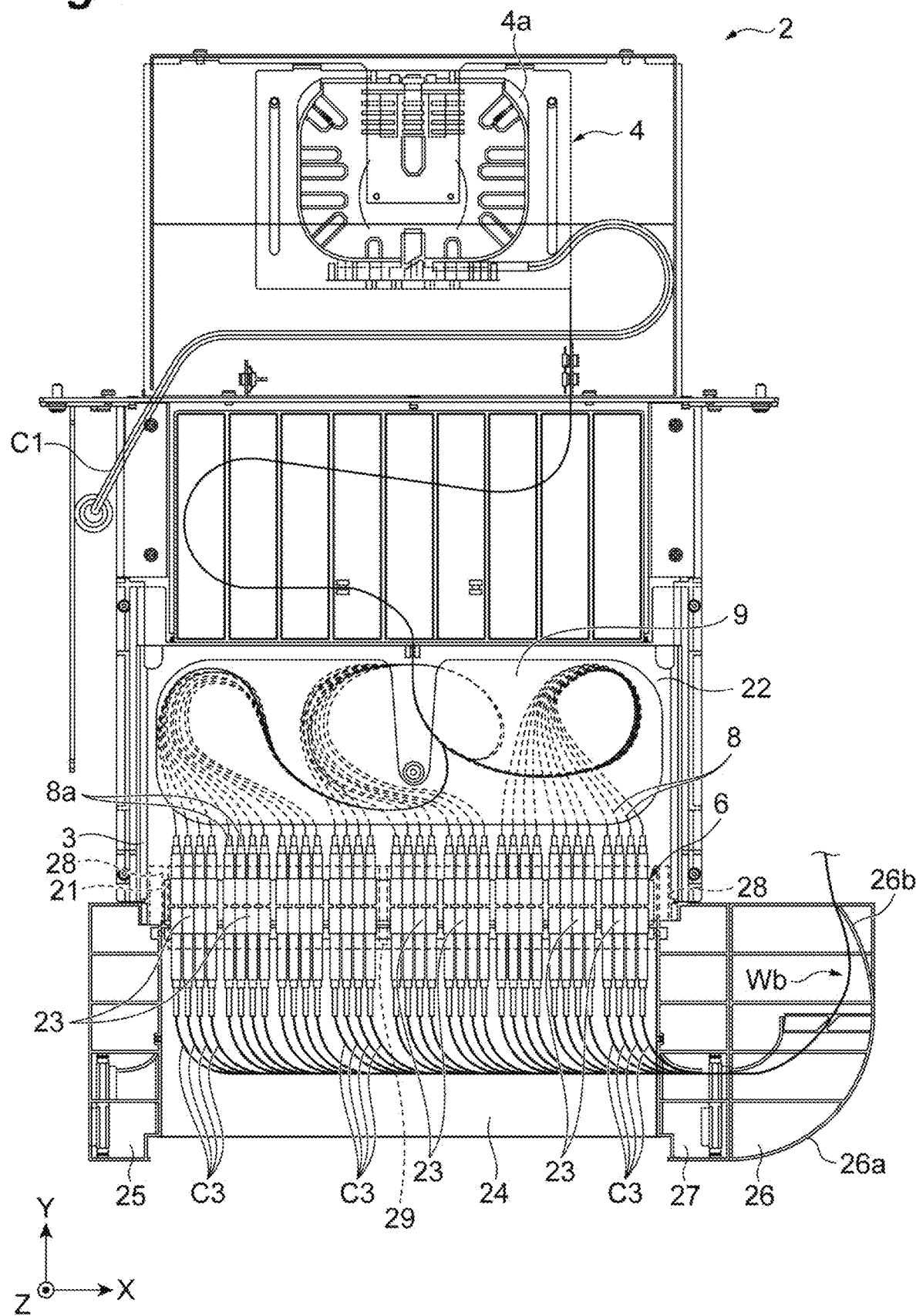
FIG. 17 is a diagram illustrating a part of an interior of a termination unit according to a modification of the embodiment.

FIG. 17 is a diagram illustrating a part of an interior of a termination unit according to a modification of the above embodiment. As illustrated in FIG. 17, an optical fiber passing part 29 through which at least one optical fiber can pass is provided in the adapter group 21. Specifically, in the plurality of adapters 23 included in the adapter group 21, the optical fiber passing part 29 is positioned in the center part in the direction X and provided between the adapters 23 that are adjacent to each other. As with the optical fiber passing part 28, the optical fiber passing part 29 is a space or a groove defined so that the optical fiber C4 (see FIG. 9) can pass through. In the modification, the optical fiber passing parts 28 and 29 are respectively provided between the housing 3 and the adapter group 21 and in the adapter group 21. Each dimension of the optical fiber passing part 29 is substantially the same as each dimension of the optical fiber passing part 28. Even in such a modification, the same operation and effect as those of the above embodiment is exerted.

The optical fiber rack according to the present disclosure is not limited to the above embodiment and modification, and various other modifications are possible. For example, in the above embodiment and modification, the termination unit 2 positioned at the lowermost position in the rack part 11 is optically connected to the optical fiber C2 housed in the local fusion cable 13c, but it is not limited thereto. As a specific example, a termination unit other than the termination unit positioned at the lowermost position may be optically connected to the optical fiber C2 housed in the local fusion cable 13c, or to the optical fibers C1 of the multi fiber cable 7c corresponding to all termination units 2.

In the above embodiment and modification, a plurality of optical fiber passing parts 28 are provided in the direction X to sandwich the adapter group 21, but the present disclosure is not limited thereto. Only one optical fiber passing part 28 may be provided in the housing 3. In this case, from the viewpoint of suppressing breakage of the tip part of the optical fiber C4, both of the optical fiber passing parts 28 and 29 may be provided in the housing 3.

In the above modification, the optical fiber passing part 29 is provided in the center part of the adapter group 21, but the present disclosure is not limited thereto. In addition, although only one optical fiber passing part 29 is provided in the adapter group 21, a plurality of optical fiber passing parts 29 may be provided. In the housing 3, the optical fiber passing part 28 may not be provided and only the optical fiber passing part 29 may be provided.

In the above embodiment and modification, in the optical fiber exchange method, the steps S101 to S105 are performed in order, but the present disclosure is not limited thereto. For example, the order of steps S103 to S105 is not limited. As a specific example, step S103 may be performed after step S104 or step S105.

In the above embodiment and modification, the curved plate 31e is provided in the optical fiber guide 17, but the present disclosure is not limited thereto. For example, the curved plate 31e may be attached to the surface of the partition plate 13. Further, the curved plate 31e is not necessarily provided. For example, a part of the optical fiber guides 17 may not have the curved plate 31e.

In the above embodiment and modification, the number of the optical fiber guides 17, and the number of the first dividing members 18 may be the same as each other, or may be different from each other. For example, the number of the optical fiber guides 17 may be the same as the number of the termination units 2, and the number of the first dividing members 18 may be smaller than the number of the termination units 2.

In the above embodiment and the modification, the restriction parts 33 and 34 are provided, but the disclosure is not limited thereto. For example, only one of the restriction parts 33 and 34 may be provided. Alternatively, the optical fiber guide may be provided with a restriction part other than the restriction parts 33 and 34. Further, a shape of the restriction parts 33 and 34 is not particularly limited. For example, the restriction part may be a part of the sidewall parts 32b and 32c of the guide part 32.

What is claimed is:

1. An optical fiber exchange method using a termination unit to be located on a rack part of an optical fiber rack, the termination unit comprising:
    a housing including a first side wall, a second side wall and a rear wall;
    a plurality of first optical fibers located in the housing, the plurality of first optical fibers being fusion spliced to a multi fiber cable introduced from an outside of the optical fiber rack;
    an adapter group including a plurality of adapters in a line in the housing, the plurality of adapters being respectively connected to the plurality of first optical fibers on an inside of the housing and being respectively connected to a plurality of second optical fibers on an outside of the housing; and
    an optical fiber passing part through which at least one optical fiber is configured to pass, the optical fiber passing part being located in at least one of: the adapter group; and between the first side wall of the housing and the adapter group in an arrangement direction of the plurality of adapters, wherein the arrangement direction corresponds to a direction in which the first side wall and the second side wall face each other, the optical fiber exchange method comprising:
    cutting a third optical fiber in the multi fiber cable outside the optical fiber rack, the third optical fiber being connected to one of the plurality of first optical fibers;
    fusion splicing a cut face of the cut third optical fiber to an exchange optical fiber;
    housing a tip part of the exchange optical fiber in the housing via the optical fiber passing part; and
    inserting the tip part of the exchange optical fiber into one of the plurality of adapters after extracting the first optical fiber to be disconnected from the one of the plurality of adapters.

2. The optical fiber exchange method according to claim 1,
    wherein the termination unit further comprises a second optical fiber passing part through which at least one optical fiber is configured to pass, and
    wherein the adapter group is interposed between the optical fiber passing part and the second optical fiber passing part in the arrangement direction.

3. The optical fiber exchange method according to claim 1,
    wherein the termination unit further comprises a second optical fiber passing part through which at least one optical fiber is configured to pass,
    wherein the optical fiber passing part is located between the first side wall of the housing and the adapter group in the arrangement direction, and
    wherein the second optical fiber passing part is located in the adapter group.

4. The optical fiber exchange method according to claim 1, wherein the termination unit further comprises a cover sheet configured to cover an optical fiber part of the plurality of first optical fibers in the housing.

5. The optical fiber exchange method according to claim 1, further comprising:
    covering the plurality of the first optical fibers in the housing by a cover sheet before the housing the tip part of the exchange optical fiber in the housing and the inserting the tip part of the exchange optical fiber into the one of the plurality of adapters.

6. The optical fiber exchange method according to claim 5, wherein the exchange optical fiber is located above the cover sheet.

7. The optical fiber exchange method according to claim 1, further comprising:
    monitoring an optical signal output from the plurality of second optical fibers; and
    specifying the third optical fiber having a connection failure.

8. The optical fiber exchange method according to claim 1, wherein the tip part of the third optical fiber includes a connector configured to insert into one of the plurality of adapters.

9. The optical fiber exchange method according to claim 1, wherein the first optical fiber to be disconnected is left in the housing after the inserting the tip part of the exchange optical fiber into the one of the plurality of adapters.

* * * * *